(12) United States Patent
Taninaka et al.

(10) Patent No.: US 9,684,377 B2
(45) Date of Patent: Jun. 20, 2017

(54) DRIVE APPARATUS, ELECTRONIC DEVICE, DRIVE CONTROL PROGRAM, AND DRIVE SIGNAL GENERATING METHOD

(71) Applicant: FUJITSU LIMITED, Kawasaki-shi, Kanagawa (JP)

(72) Inventors: Kiyoshi Taninaka, Ebina (JP); Yasuhiro Endo, Ebina (JP); Akihiko Yabuki, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/139,465

(22) Filed: Apr. 27, 2016

(65) Prior Publication Data
US 2016/0239089 A1 Aug. 18, 2016

Related U.S. Application Data

(63) Continuation of application No. PCT/JP2013/082803, filed on Dec. 6, 2013.

(51) Int. Cl.
*G08B 21/00* (2006.01)
*G08B 19/00* (2006.01)
(Continued)

(52) U.S. Cl.
CPC .............. *G06F 3/016* (2013.01); *B06B 1/045* (2013.01); *B06B 1/06* (2013.01); *G06F 3/041* (2013.01); *H02P 25/032* (2016.02)

(58) Field of Classification Search
CPC .............. B60L 11/1838; B60L 11/1818; Y02T 10/7072; Y02T 90/163; Y02T 90/128;
(Continued)

(56) References Cited

U.S. PATENT DOCUMENTS

| 4,453,440 A | * | 6/1984 | Mitarai | G10H 1/057 84/604 |
| 6,020,876 A | * | 2/2000 | Rosenberg | G06F 3/011 345/157 |

(Continued)

FOREIGN PATENT DOCUMENTS

| JP | 2002-149312 | 5/2002 |
| JP | 2008-521597 | 6/2008 |

(Continued)

OTHER PUBLICATIONS

International Search Report of Int. Appl. No. PCT/JP2013/082803 dated Mar. 11, 2014 (2 pages).
(Continued)

*Primary Examiner* — Steven Lim
*Assistant Examiner* — Muhammad Adnan
(74) *Attorney, Agent, or Firm* — Fujitsu Patent Center

(57) ABSTRACT

A drive apparatus includes a memory to store waveform data representing a sinusoidal drive signal satisfying a frequency $f1=(m/n) \times q(t)$ (m and n: natural numbers, m≠n), to vibrate a vibration-generating device m times, where q(t) is a time characteristic of a resonance frequency of the vibration-generating device, or $((m/2) \times r)$ times (r: natural number≠0, m and n: positive odd, m≠n), the vibration-generating device having the resonance frequency varying depending on an acceleration amplitude in a range between first and second resonance frequencies including the rated value f0; and a drive-processor to output the drive signal to the vibration-generating device. The q(t) is obtained when driving the vibration-generating device by a sinusoidal drive signal satisfying $f1=(m/n) \times f2$, to vibrate the vibration-generating device m times if m≠n, or $((m/2) \times r)$ times.

6 Claims, 30 Drawing Sheets

(51) Int. Cl.
  *H04Q 1/30* (2006.01)
  *G08B 5/22* (2006.01)
  *H04B 3/36* (2006.01)
  *G08B 23/00* (2006.01)
  *G09B 21/00* (2006.01)
  *H04M 11/00* (2006.01)
  *H04M 3/00* (2006.01)
  *G06F 3/01* (2006.01)
  *B06B 1/06* (2006.01)
  *G06F 3/041* (2006.01)
  *B06B 1/04* (2006.01)
  *H02P 25/032* (2016.01)

(58) Field of Classification Search
  CPC ....... Y02T 90/14; Y02T 90/16; Y02T 90/121; Y02T 10/7005
  See application file for complete search history.

(56) References Cited

U.S. PATENT DOCUMENTS

| | | | | |
|---|---|---|---|---|
| 7,765,869 | B2* | 8/2010 | Sung | G01C 19/56 73/504.04 |
| 8,325,144 | B1* | 12/2012 | Tierling | G06F 3/016 345/156 |
| 9,239,425 | B2* | 1/2016 | Capmany Francoy | G02B 6/12011 |
| 9,524,624 | B2* | 12/2016 | Rank | G08B 6/00 |
| 2002/0149561 | A1* | 10/2002 | Fukumoto | G01C 21/3664 345/156 |
| 2006/0064259 | A1* | 3/2006 | Zeng | G01N 29/032 702/70 |
| 2006/0119573 | A1* | 6/2006 | Grant | B06B 1/0215 345/156 |
| 2006/0290662 | A1* | 12/2006 | Houston | A63F 13/06 345/156 |
| 2008/0084384 | A1* | 4/2008 | Gregorio | G06F 3/016 345/156 |
| 2008/0198139 | A1* | 8/2008 | Lacroix | G06F 3/016 345/173 |
| 2010/0302184 | A1* | 12/2010 | East | G06F 3/016 345/173 |
| 2010/0309141 | A1* | 12/2010 | Cruz-Hernandez | G06F 3/016 345/173 |
| 2010/0309142 | A1* | 12/2010 | Cruz-Hernandez | G06F 3/041 345/173 |
| 2011/0074706 | A1* | 3/2011 | Son | G06F 3/016 345/173 |
| 2011/0163985 | A1* | 7/2011 | Bae | G06F 3/016 345/173 |

FOREIGN PATENT DOCUMENTS

| | | |
|---|---|---|
| JP | 2010-506499 | 2/2010 |
| JP | 2010-287231 | 12/2010 |
| JP | 2010-287232 | 12/2010 |
| JP | 2011-501296 | 1/2011 |
| JP | 2011-507088 | 3/2011 |
| JP | 2012-020284 | 2/2012 |
| WO | 2006/071449 | 7/2006 |
| WO | 2008/045694 | 4/2008 |
| WO | 2009/051976 | 4/2009 |
| WO | 2009/074826 | 6/2009 |

OTHER PUBLICATIONS

CNOA—Office Action mailed on Mar. 17, 2017 issued with respect to the corresponding Chinese Patent Application No. 201380081126.X with partial translated office action.

* cited by examiner

LRA (VCM-TYPE)
(linear resonant actuator)
(voice coil motor)

LRA (PIEZO-TYPE)

$F = 0.01 \sin 2\pi f_1 t \quad f_1 = 350 Hz$ $m = 2, n = 1$

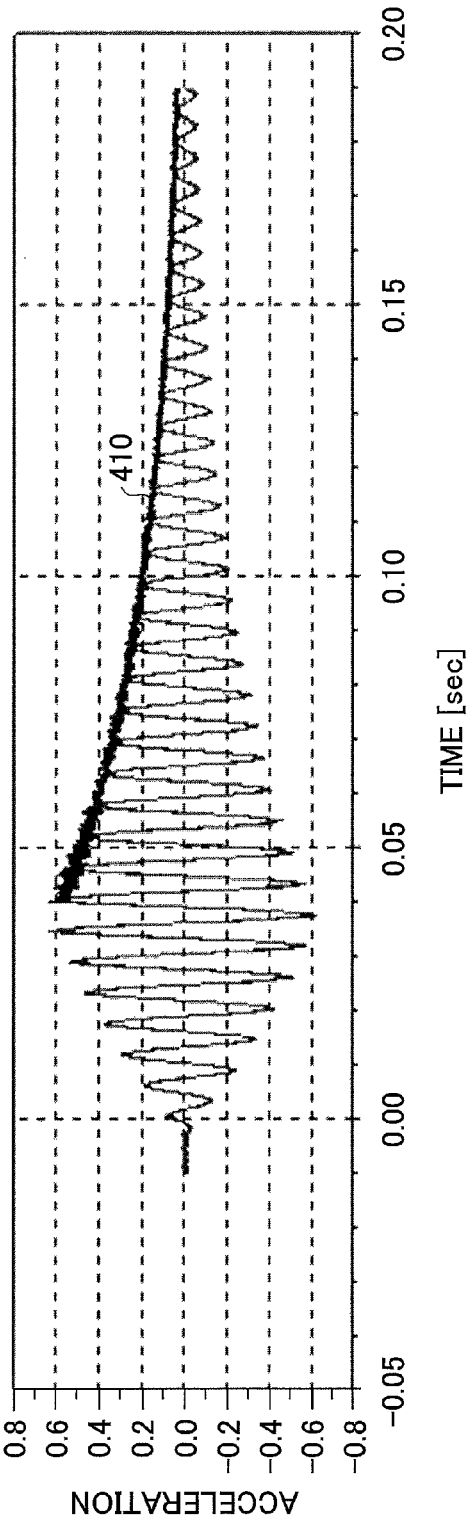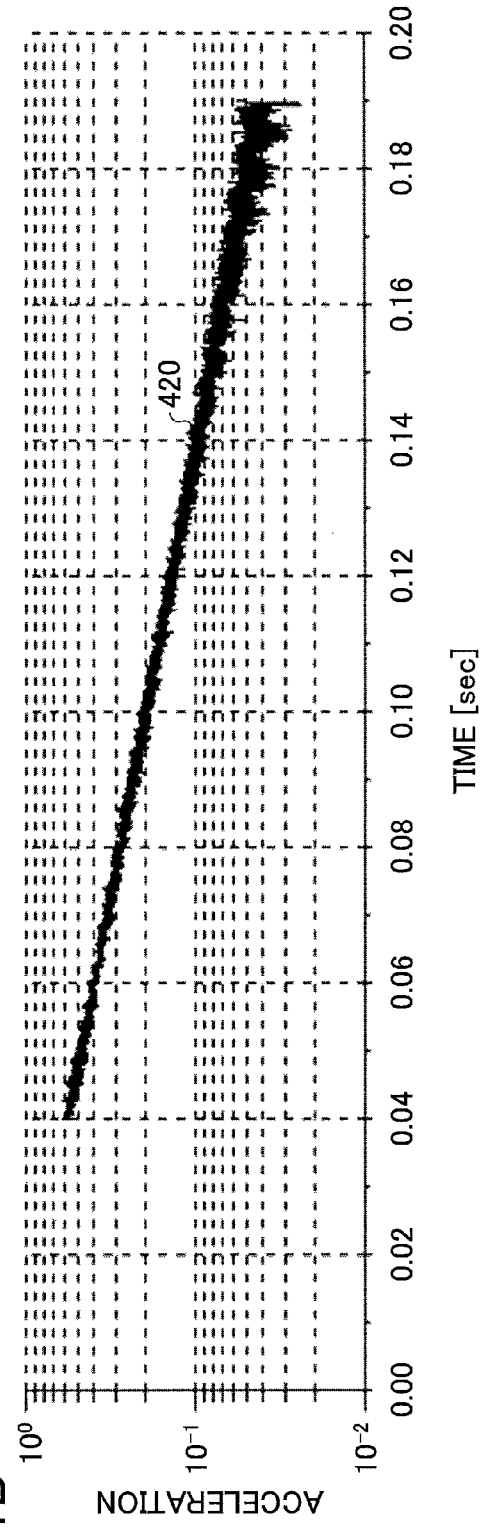

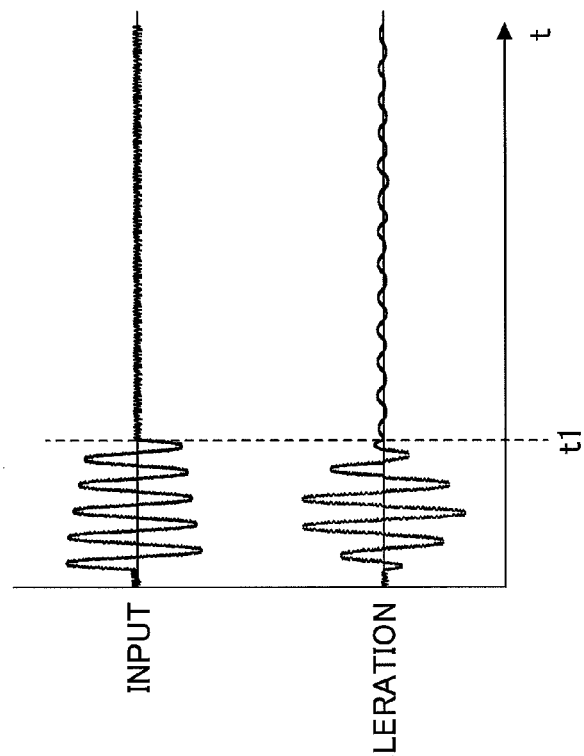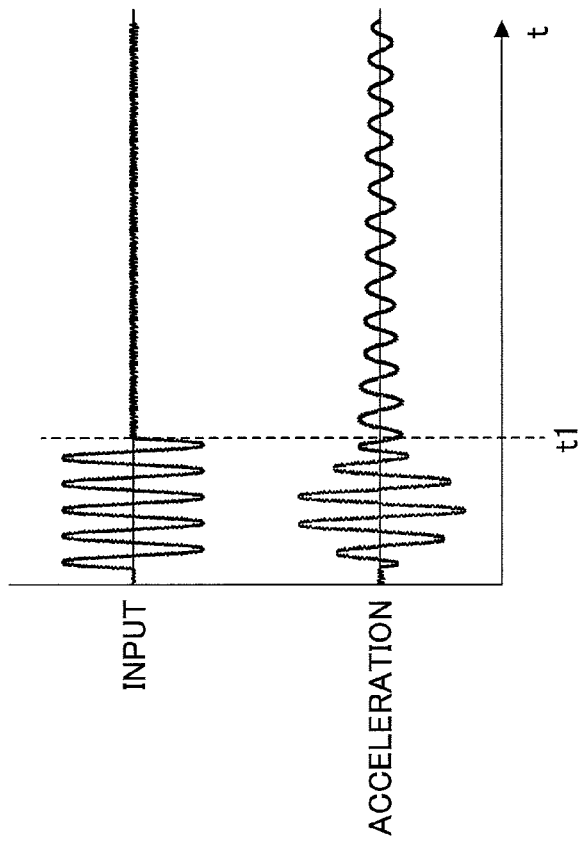

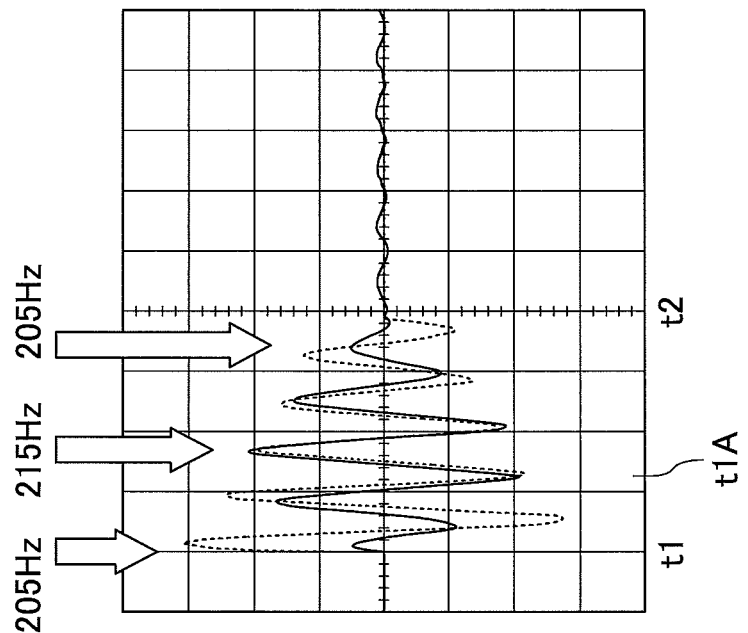
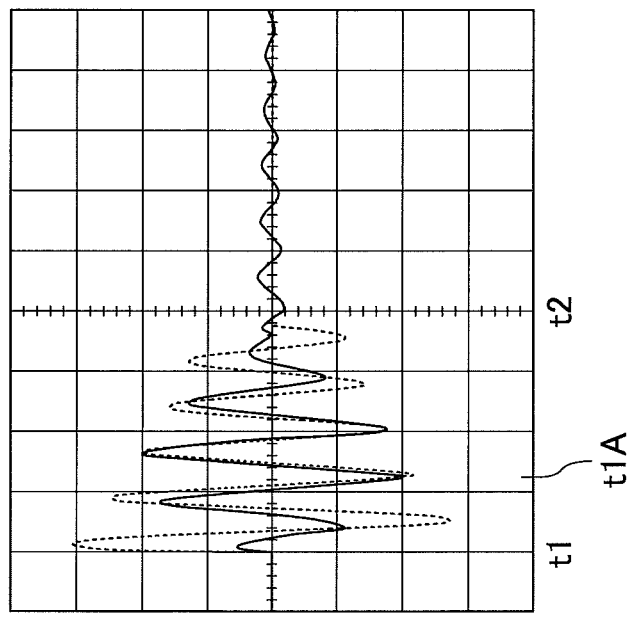

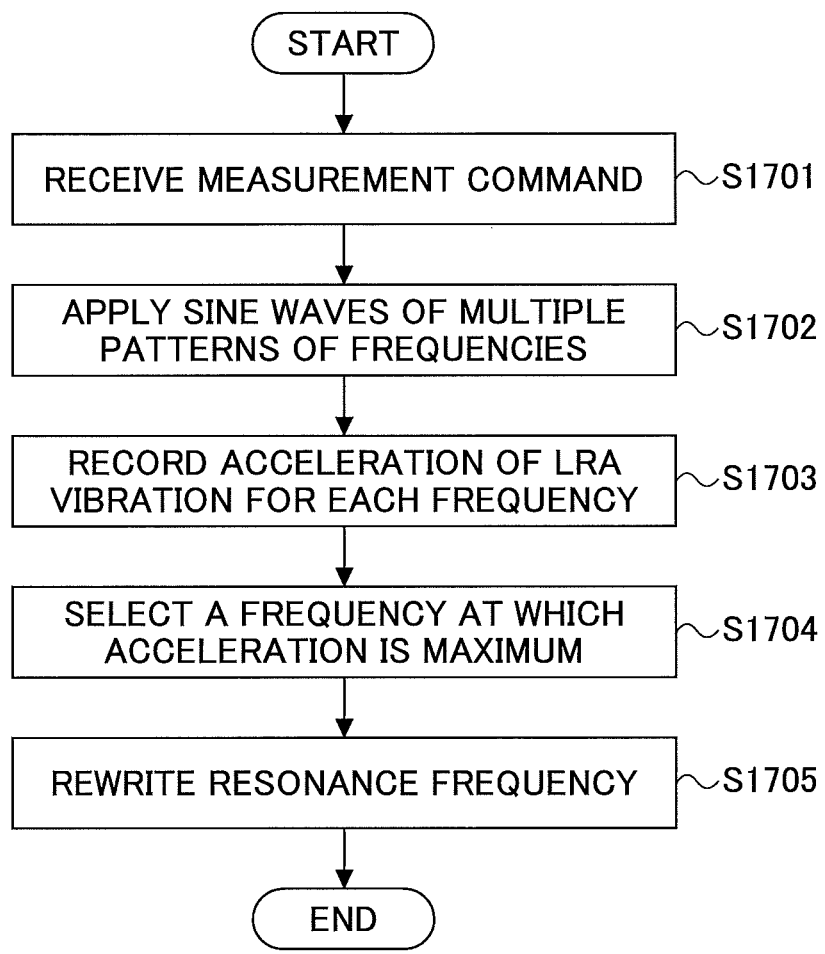

DRIVE APPARATUS, ELECTRONIC DEVICE, DRIVE CONTROL PROGRAM, AND DRIVE SIGNAL GENERATING METHOD

CROSS-REFERENCE TO RELATED APPLICATIONS

This application is a continuation application of International Application PCT/JP2013/082803 filed on Dec. 6, 2013 and designated the U.S., the entire contents of which are incorporated herein by reference.

FIELD

The following disclosure relates to a drive apparatus, an electronic device, a drive control program, and a drive signal generating method that drive a vibration-generating device.

BACKGROUND

Conventionally, there has been a user/machine interface including a panel that has a surface and can sustain flexural waves, a touch-sensitive input device that has the surface associated, and a unit that includes a force transducer to give force feedback to the input device. The force is given in a format of pulses on the panel, the pulse is given in a format of a modulation signal that presents a sense of button-clicking at the fingertip of a user, and the modulation signal has a base carrier frequency in the range of 150 to 750 Hz and having the duration of at least 10 ms (see, for example, Patent Document 1).

RELATED-ART DOCUMENTS

Patent Documents

[Patent Document 1] Japanese Laid-open Patent Publication No. 2012-20284

However, by such a conventional apparatus, it is difficult to present a favorable sense of touch when the frequency of the vibration-generating device varies depending on the acceleration amplitude.

SUMMARY

According to an aspect of the disclosure, a drive apparatus includes a memory configured to store waveform data that represents a first drive signal configured to vibrate a vibration-generating device m times, the first drive signal being a sine wave satisfying a frequency $f1=(m/n) \times q(t)$ (where m and n are natural numbers other than zero, different from each other), $q(t)$ being a time characteristic of a resonance frequency of the vibration-generating device, or a second drive signal configured to vibrate the vibration-generating device $((m/2) \times r)$ times (where r is a natural number other than zero), the second drive signal being a sine wave satisfying the frequency $f1=(m/n) \times q(t)$ (where m and n are positive odd numbers different from each other), wherein the vibration-generating device having a rated value f0 of the resonance frequency, and having a frequency characteristic such that the resonance frequency varies depending on an acceleration amplitude in a first range from a first resonance frequency to a second resonance frequency including the rated value f0; and a drive-processor configured to read the waveform data stored in the memory, and to output the first drive signal or the second drive signal corresponding to the waveform data to the vibration-generating device, wherein the time characteristic $q(t)$ is a time characteristic such that the resonance frequency of the vibration-generating device varies with time, the time characteristic $q(t)$ being obtained when driving the vibration-generating device by a third drive signal configured to vibrate the vibration-generating device m times, the third drive signal being a sine wave satisfying the frequency $f1=(m/n) \times f2$ (where m and n are natural numbers other than zero, different from each other), f2 being a frequency included in a second range of the resonance frequency, the second range taking an error into consideration, or a fourth drive signal configured to vibrate the vibration-generating device $((m/2) \times r)$ times (where r is a natural number other than zero), the fourth drive signal being a sine wave satisfying the frequency $f1=(m/n) \times f2$ (where m and n are positive odd numbers different from each other).

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIGS. 21A-21B are diagrams that illustrate damping of acceleration of free vibration;

FIGS. 23A-23B are diagrams that illustrate differences of the residual vibration with and without a damping characteristic;

FIGS. 29A-29B are diagrams that illustrate waveforms of drive signals and displacement of responsive vibrations by a method of drive control of an LRA 140 according to the first embodiment;

FIG. 34 is a flowchart that illustrates a measurement process of a resonance frequency according to the second embodiment.

DESCRIPTION OF EMBODIMENTS

First Embodiment

Figure 1B:
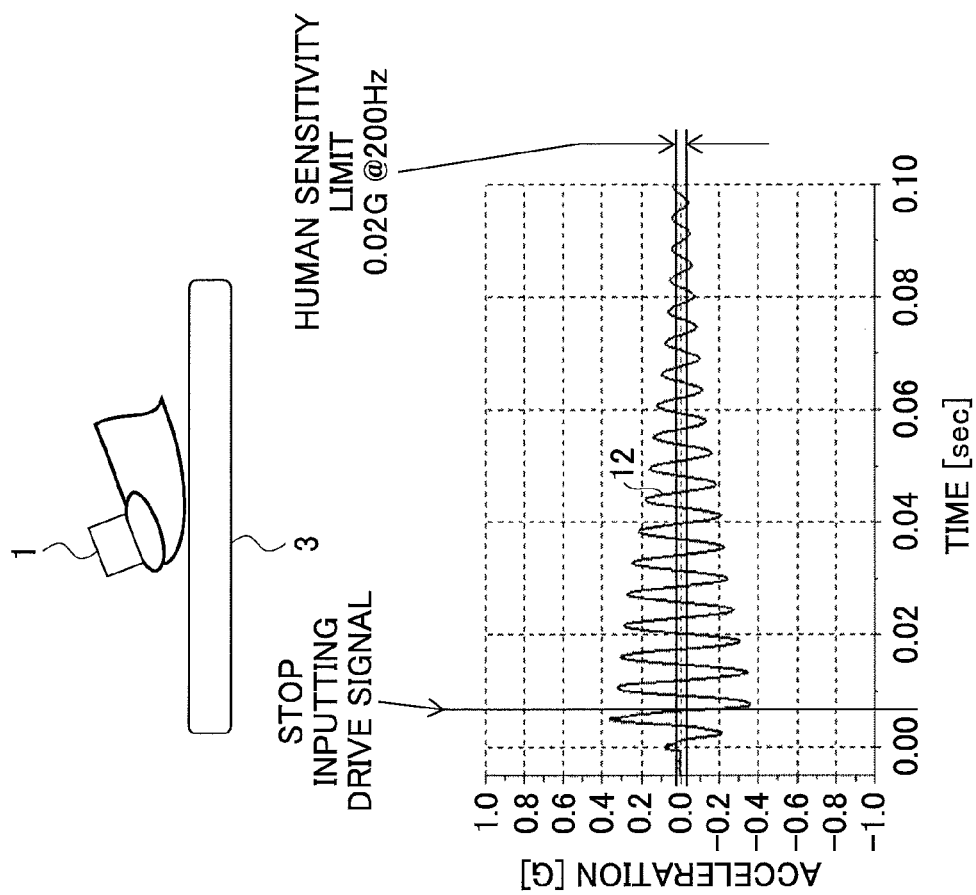
FIGS. 1A-1B are diagrams that illustrate an overview of a first embodiment.
Figure 1A:
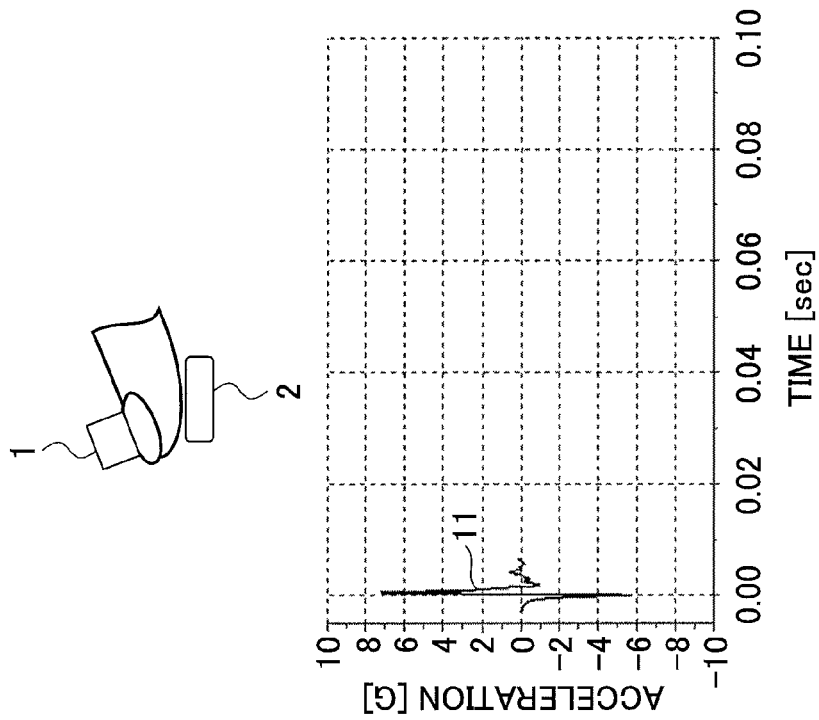

In the following, an overview of a first embodiment will be described with reference to FIGS. 1A-1B. FIGS. 1A-1B are diagrams that illustrate an overview of the first embodiment.

FIG. 1A is a diagram that illustrates a waveform 11 of acceleration of vibration that is generated when pressing a button 2 by a human finger having an accelerometer 1 attached. FIG. 1B is a diagram that illustrates a waveform 12 of acceleration of vibration that is generated when pressing a touch panel 3 having an LRA (Linear Resonant Actuator) attached, by the human finger having the accelerometer 1 attached. In the example in FIG. 1, the button 2 is, for example, a metal-dome button. Also, the button 2 and the touch panel 3 are disposed on an electronic device.

The vibration represented by the waveform 11 damps steeply in one to several cycles. In contrast to this, the vibration represented by the waveform 12 lasts even after supply of the drive signal has been stopped, until the free vibration by the natural vibration frequency of the LRA damps. In the following description, the free vibration by the natural vibration frequency of an LRA that lasts after supply of the drive signal has been stopped, will be referred to as the "residual vibration".

Figure 2:
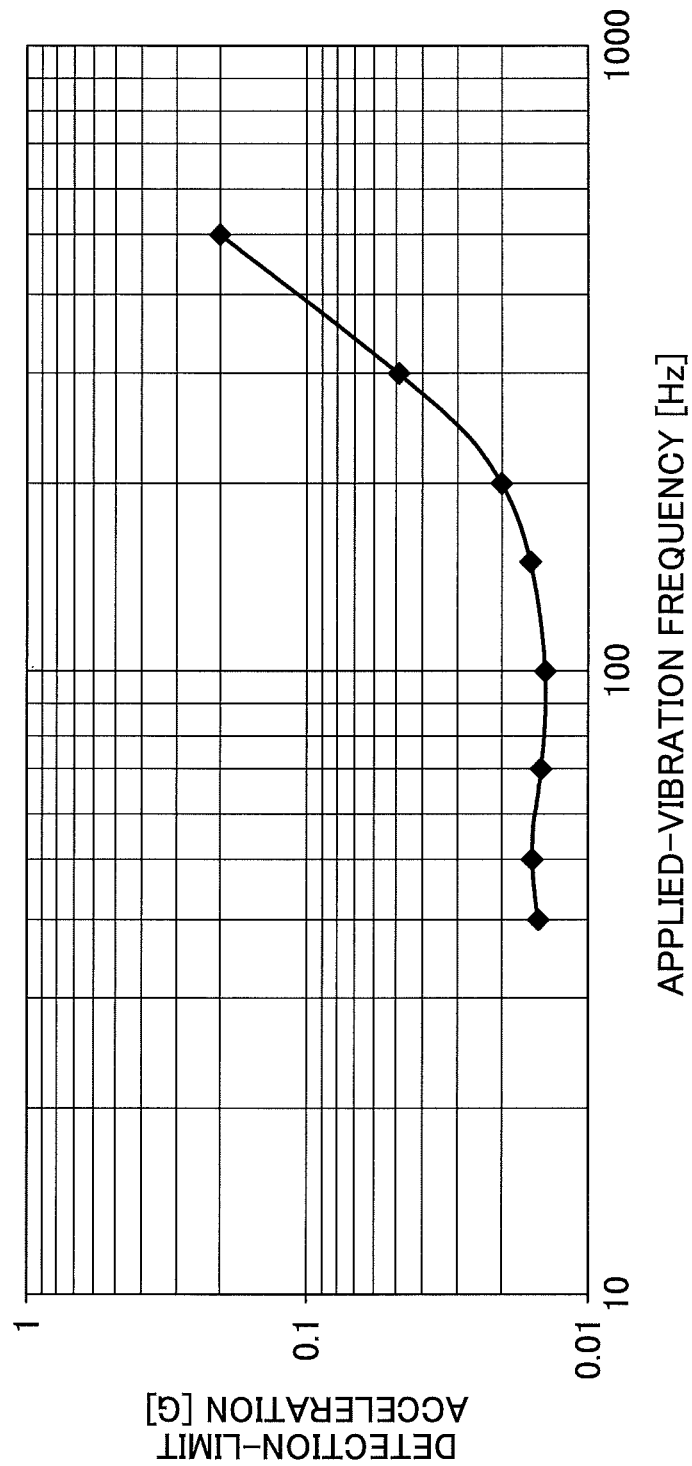
FIG. 2 is a diagram that illustrates the sensitivity of an acceleration perceiving organ of a human being.

Incidentally, a human finger cannot perceive vibration when acceleration of the vibration becomes less than or equal to 0.02 G at a vibration frequency of 200 Hz. The vibration frequency is the number of vibrations per second. The acceleration of vibration represents an amount of speed change of the vibration per unit time. FIG. 2 is a diagram that illustrates the sensitivity of an acceleration perceiving organ of a human being. Note that an acceleration perceiving organ of a human being is Pacini's corpuscle. Pacini's corpuscle is one of principal four types of kinetic receptors found mainly on the skin.

In other words, with the waveform 11, a finger soon becomes insensitive to the vibration because the acceleration of the vibration becomes less than or equal to 0.02 G within 0.01 s. In contrast to this, the waveform 12 requires 0.1 s until the acceleration of the vibration becomes less than or equal to 0.02 G, and hence, the finger continues to perceive the vibration until 0.1 s passes. Therefore, the vibration represented by the waveform 11 and the vibration represented by the waveform 12 present totally different senses of touch, respectively, in terms of perception by a human being.

Thereupon, in the first embodiment, the residual vibration is checked so that generated vibration steeply damps in one to several cycles, to present the sense of clicking.

The first embodiment focuses on a fact that the residual vibration is not generated when supplying to an LRA 140 a drive signal that satisfies a specific condition, with which the vibration of the LRA 140 stops in one to several cycles, and applies this drive signal that satisfies the specific condition to the LRA 140.

Figure 3:
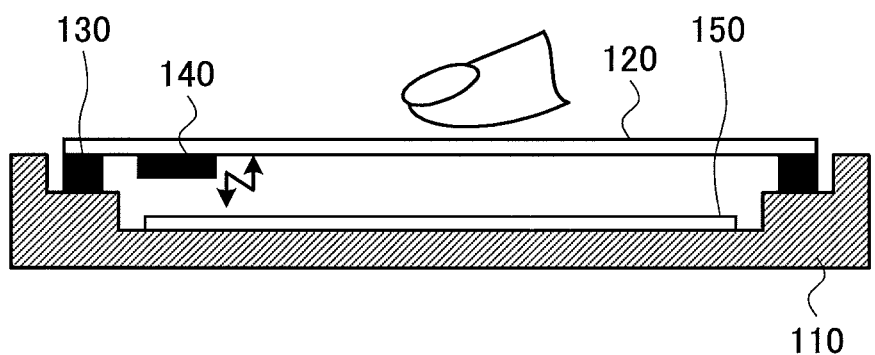
FIG. 3 is a diagram that illustrates an electronic device according to the first embodiment.

In the following, an electronic device will be described according to the first embodiment with reference to FIG. 3. FIG. 3 is a diagram that illustrates an electronic device in the first embodiment.

The electronic device in the first embodiment may be any device that includes, for example, a touch panel as an input unit, having a display function and an input function. For example, the electronic device in the first embodiment may be a smart phone, a tablet-type computer, a mobile information terminal, or the like.

The electronic device 100 in the first embodiment includes a housing 110, a touch panel 120, double-sided tape 130, the LRA 140, and a substrate 150.

The electronic device 100 in the first embodiment has the touch panel 120 fixed on the housing 110 by the double-sided tape 130. The LRA 140 is attached on the housing-side surface of the touch panel 120. The LRA 140 is a vibration-generating device constituted with a combination of a vibration system having its resonance frequency designed in advance, and an actuator, to generate vibration when driven mainly by the resonance frequency, and the vibration amount changes depending on the amplitude of a drive waveform. The LRA 140 will be described in detail later. Note that although the LRA 140 is assumed to be a vibration-generating device in the first embodiment, the device is not limited to an LRA as long as the structure includes a resonance device and an actuator for applying vibration.

The substrate 150 is disposed in the housing 110. The substrate 150 has a driver IC mounted that outputs a drive signal to a drive apparatus and the LRA 140 to control driving the LRA 140.

In response to a finger of the user contacting the touch panel 120, the electronic device 100 in the first embodiment senses the contact, drives the LRA 140 by the drive apparatus mounted on the substrate 150, and propagates the vibration of the LRA 140 to the touch panel 120.

Note that the electronic device 100 in the first embodiment may be any device having the touch panel 120 as an input operation unit. Therefore, it may be a device that is installed and used at a specific place, for example, an ATM (Automatic Teller Machine).

Figure 4A:
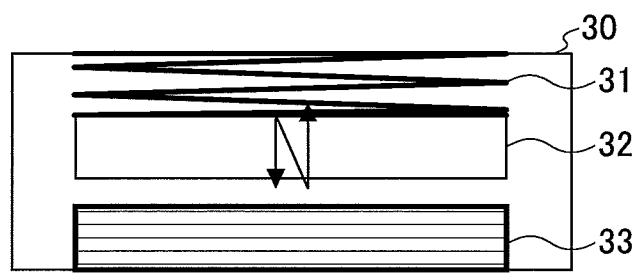
FIGS. 4A-4B are diagrams that illustrate examples of LRAs.
Figure 4B:
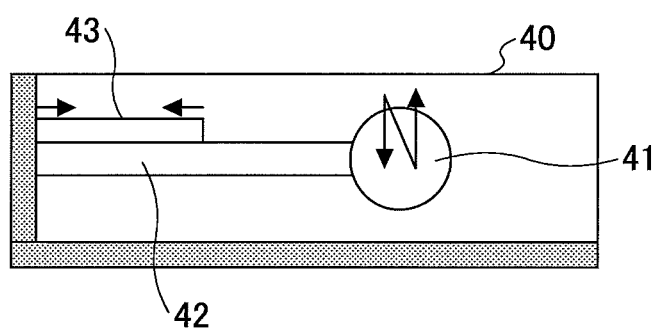

In the following, the LRA 140 will be described with reference to FIGS. 4A-4B. FIGS. 4A-4B are diagrams that illustrate examples of LRAs. FIG. 4A is an example of an LRA 30 that uses a voice coil, and FIG. 4B is an example of an LRA 40 that uses a piezo electric device.

The LRA 30 illustrated in FIG. 4A includes a spring 31, a magnet 32, and a coil 33. The natural vibration frequency f0 of the LRA 30 is represented by the following Formula (1) where k is the spring constant of the spring 31, and m is the mass of the magnet 32.

$$f_0 = \frac{1}{2\pi}\sqrt{\frac{k}{m}} \quad (1)$$

The LRA 40 illustrated in FIG. 4B includes a weight 41, a beam 42, and a piezo electric device 43. The natural vibration frequency f0 of the LRA 40 is represented by the following Formula (2) where m is the mass of the weight 41, E is Young's modulus of the beam 42, I is the cross sectional secondary moment of the beam 42, and L is the length of the beam 42 in the longitudinal direction.

$$f_0 \approx \frac{1}{2\pi}\sqrt{\frac{3EI}{mL^3}} \quad (2)$$

As the LRA 140 in the first embodiment, the LRA 30 using the voice coil may be adopted, or the LRA 40 using the piezo electric device 43 may be adopted.

Figure 5:
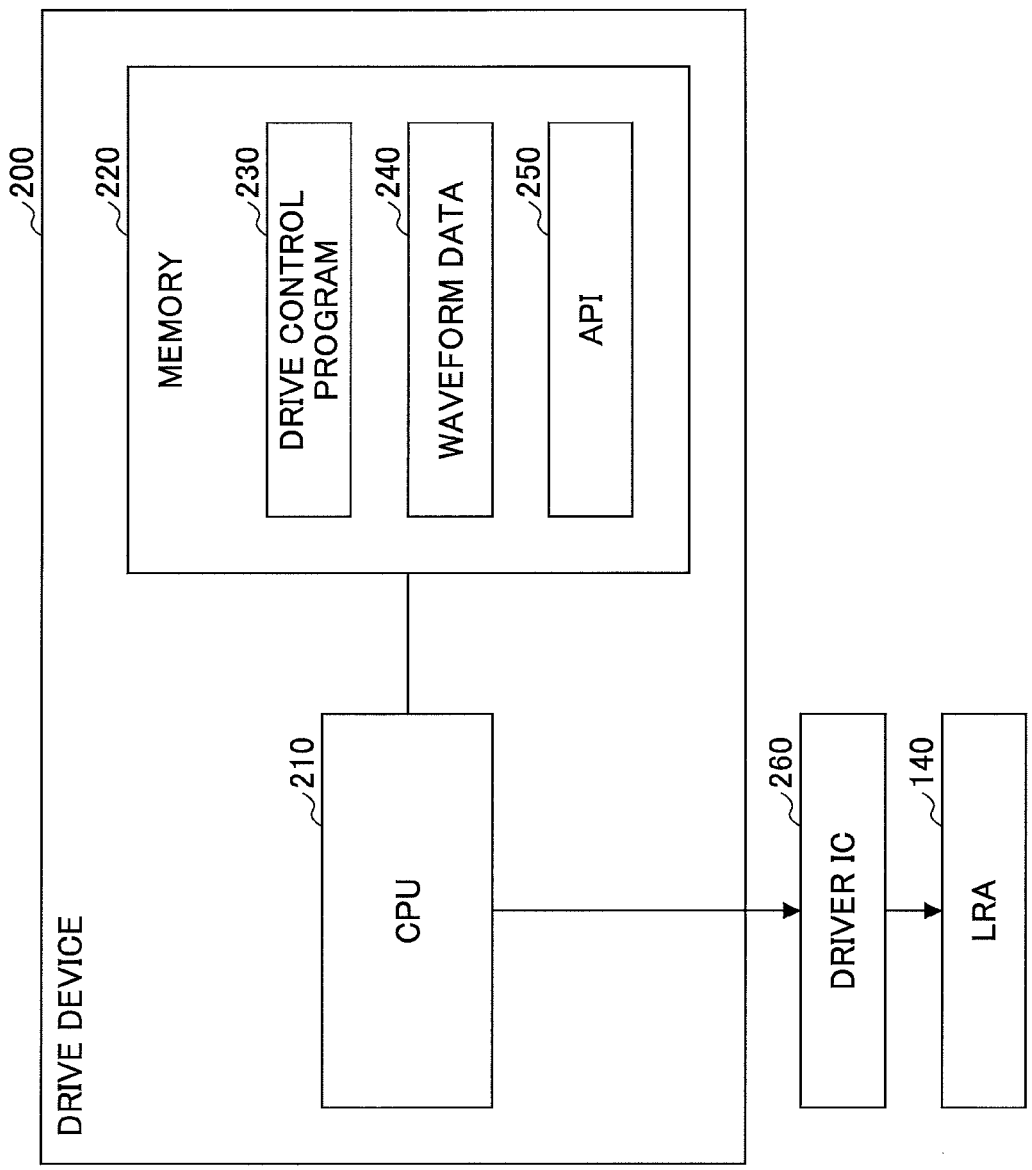
FIG. 5 is a diagram that illustrates a drive apparatus according to the first embodiment.

Next, the drive apparatus mounted on the substrate 150 included in the electronic device 100 in the first embodiment will be described with reference to FIG. 5. FIG. 5 is a diagram that illustrates the drive apparatus 200 in the first embodiment.

The drive apparatus 200 in the first embodiment includes a CPU (Central Processing Unit) 210 and a memory 220. The CPU 210 reads and executes a drive control program 230 that is stored in the memory 220, to execute a drive process of the LRA 140 as will be described later. The memory 220 includes a storage area to store the drive control program 230 to control driving the LRA 140, a storage area to store waveform data 240, and a storage area to store an API (Application Programming Interface) 250 to provide a sense of touch.

The drive control program 230 has the CPU 210 execute drive control of the LRA 140. The waveform data 240 is data of a drive waveform that is generated in advance to present the sense of clicking by vibration generated by the LRA 140. The waveform data 240 will be described in detail later. The API 250 is activated by the drive control program 230, and executes various processes to present the sense of touch. Although the API 250 is assumed to be stored in the memory 220 in FIG. 5, it may be stored in another memory mounted on the substrate 150.

Figure 6:
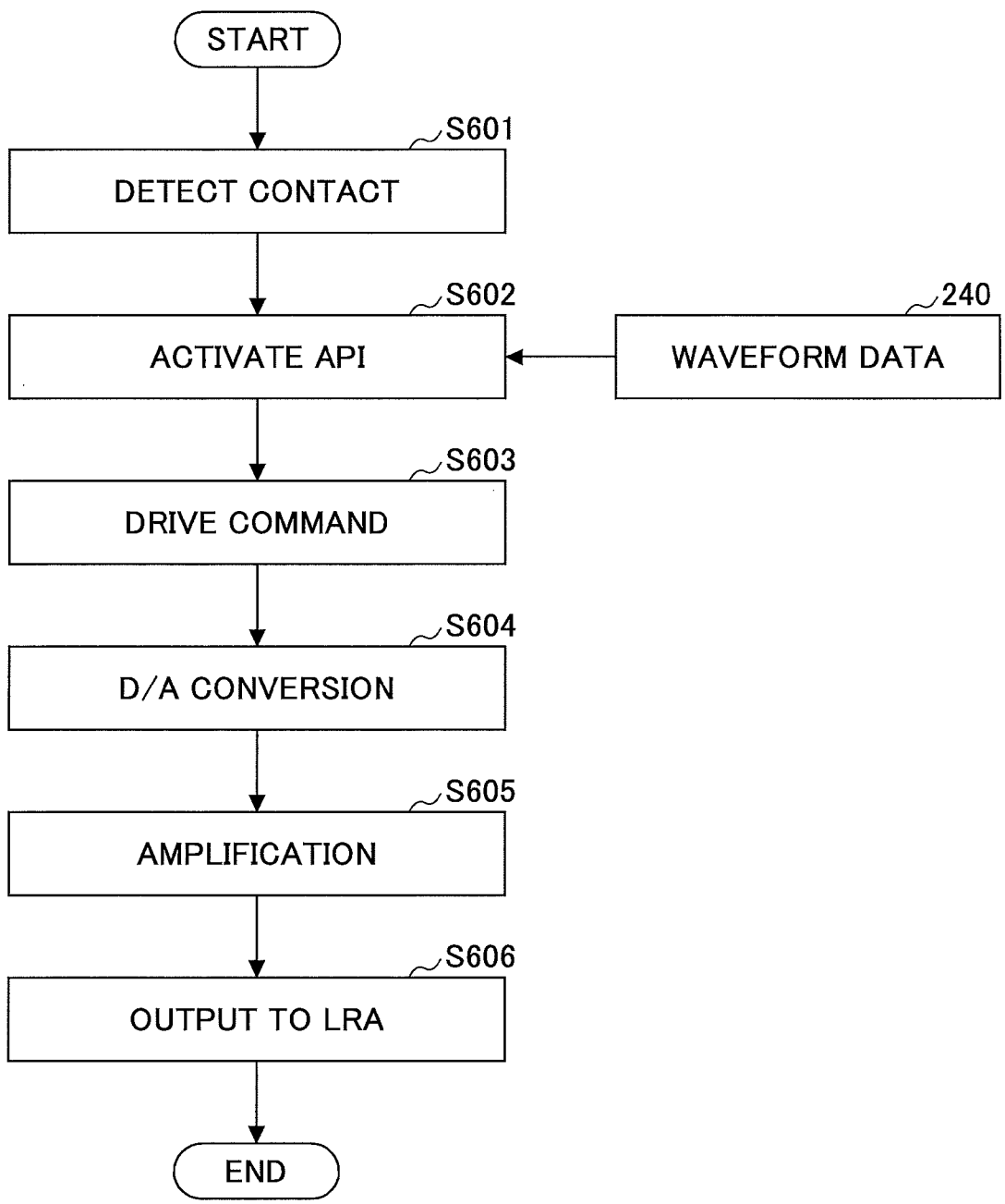
FIG. 6 is a flowchart that illustrates driving an LRA by a drive apparatus according to the first embodiment.

FIG. 6 is a flowchart that illustrates driving the LRA 140 by the drive apparatus 200 according to the first embodiment.

Once detecting a contact on the touch panel 120 (Step S601), the drive apparatus 200 in the first embodiment activates the API 250 (Step S602). Specifically, the drive apparatus 200 may activate the API 250, for example, in response to a contact on a button displayed on the touch panel 120.

The API 250 reads the waveform data 240 stored in the memory 220, and outputs a drive command that corresponds to the waveform data 240 to the driver IC 260 (Step S603). In response to receiving the drive command, the driver IC 260 applies D/A (Digital to Analog) conversion to the waveform data 240 (Step S604), and amplifies it by an amplifier or the like (Step S605). The driver IC 260 outputs the amplified signal to the LRA 140 (Step S606).

In the following, the waveform data 240 in the first embodiment will be described. The waveform data 240 in the first embodiment is data that represents a waveform of a drive signal that satisfies a specific condition to stop the residual vibration.

The drive signal that satisfies the specific condition is a signal that vibrates the LRA 140 m times at a frequency f1, where f1=((m/n)×f0), f0 is the natural vibration frequency of the LRA 140 (referred to as the "resonance frequency" below), m and n are natural numbers other than zero, and m≠n.

Figure 7:
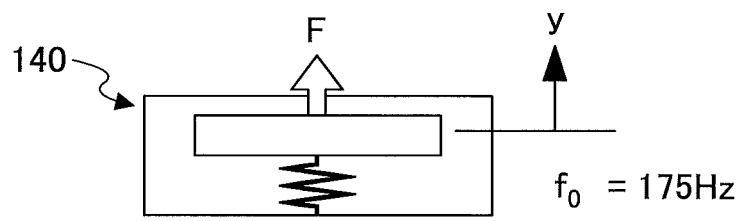
FIG. 7 is an example of a schematic view of an LRA.
Figure 8:
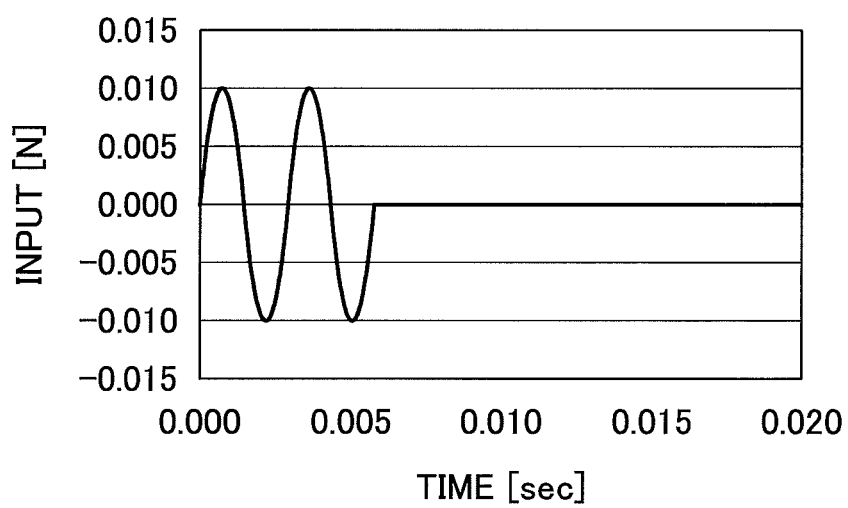
FIG. 8 is a diagram that illustrates an example of a drive signal of an LRA according to the first embodiment.

FIG. 7 is an example of a schematic view of the LRA 140 in the first embodiment, and FIG. 8 is a diagram that illustrates an example of the drive signal of the LRA 140 in the first embodiment.

As illustrated in FIG. 7, the LRA 140 in the first embodiment has the resonance frequency f0=175 Hz, the weight of 1.5 g, and the spring constant supporting the weight being 1813.5 N/m.

With setting m=2 and n=1, the drive signal in the first embodiment has the frequency f1=2/1×175=350 Hz. The drive signal Z having the frequency f1 exhibits a waveform illustrated in FIG. 8. In the example in FIG. 8, the drive signal is represented by Z=0.01 sin 2πf1t. The drive signal Z in FIG. 8 is a two-cycle sine wave as m=2.

In the first embodiment, for example, data that represents the drive signal Z illustrated in FIG. 8 is stored in the memory 220 as the waveform data 240. The waveform data 240 may include, for example, the value of the frequency f1, the values of the amplitude and the phase, the values of m and n of the drive signal Z. Alternatively, the waveform data 240 may be data that represents the waveform of the drive signal Z as it is.

Also, in the first embodiment, it is preferable to set the frequency f1 of the drive signal Z so that the error with respect to m/n×f0 is less than or equal to 1%. By setting the frequency f1 in this way, even if the residual vibration is generated after the drive signal application has been stopped, the acceleration of the vibration becomes less than or equal to 0.02 G, which is the lower limit of the perception of a human being. Therefore, the vibration is not perceived by a human being, and the sense of clicking is not degraded.

At Step S603 in FIG. 6, the drive apparatus 200 in the first embodiment has the API 250 read the waveform data 240 that represents the drive signal Z, and outputs the drive command that corresponds to the waveform data 240 to the driver IC 260. The driver IC 260 applies D/A conversion to the waveform data 240, amplifies it, and outputs it to the LRA 140.

Here, a case will be described where the drive signal Z is applied to the LRA 140 in the drive apparatus 200 in the first embodiment.

When the drive signal Z is applied to the LRA 140, forced vibration having the frequency f1, and free vibration having the resonance frequency of the LRA 140 f0 are generated on the LRA 140, and the composite wave of these generates the displacement of the LRA 140.

Figure 9A:
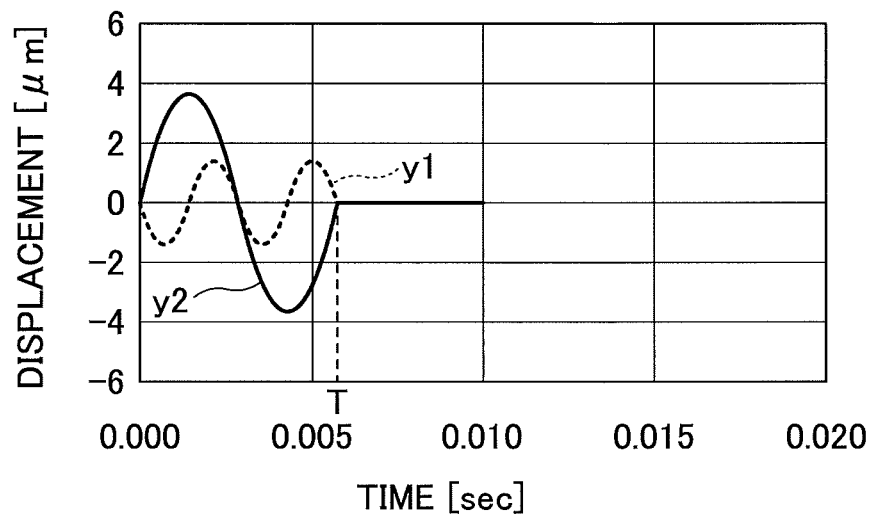
FIGS. 9A-9B are diagrams that illustrate displacement of an LRA.
Figure 9B:
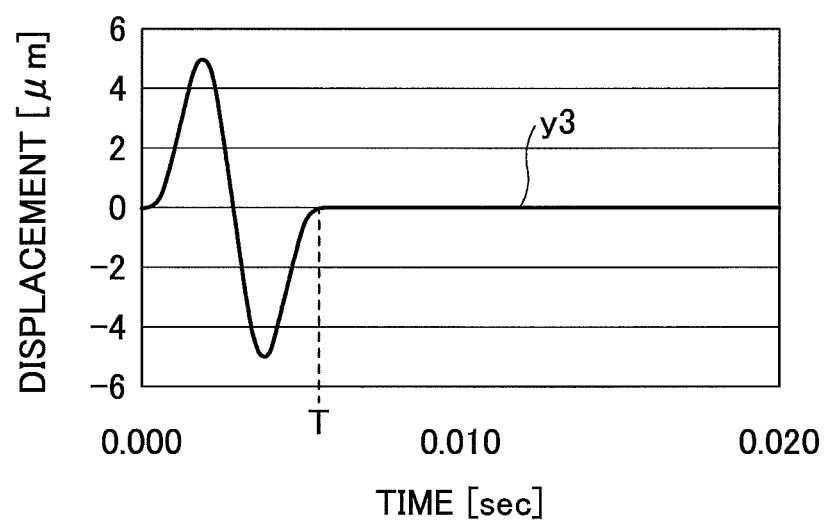

FIGS. 9A-9B are diagrams that illustrate the displacement of the LRA 140. FIG. 9A is a first diagram that illustrates the displacement, and FIG. 9B is a second diagram that illustrates the displacement.

In FIG. 9A, a waveform designated by a dotted line represents a forced vibration component y1 of the vibration displacement generated when the drive signal Z is applied to the LRA 140, and a waveform designated by a solid line represents a free vibration component y2. A response displacement y3 generated when the drive signal Z is applied to the LRA 140 is the composite wave of the forced vibration component y1 and the free vibration component y2.

FIG. 9B is a diagram that illustrates an example of the response displacement y3. It can be seen that the response displacement y3 becomes zero at timing T when the drive signal Z becomes zero.

At the timing T when the drive signal Z becomes zero, both the speed of the vibration and the acceleration of the vibration of the LRA 140 become zero, and hence, the vibration of the LRA 140 stops.

Figure 10A:
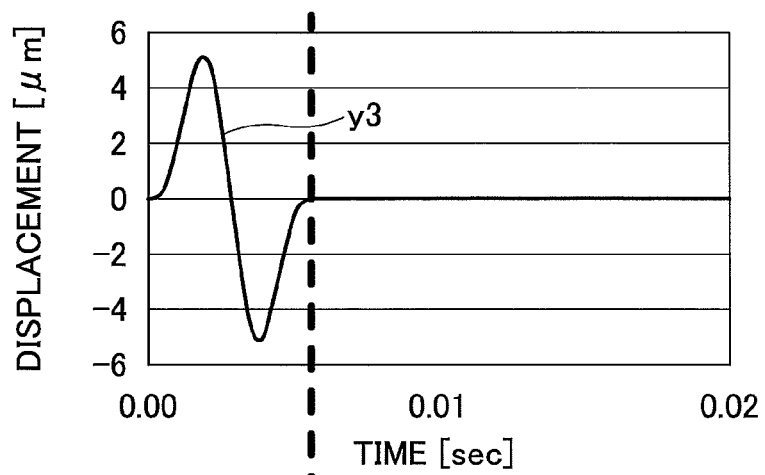
FIGS. 10A-10C are diagrams that illustrate an example of speed of vibration and acceleration of vibration of an LRA.
Figure 10B:
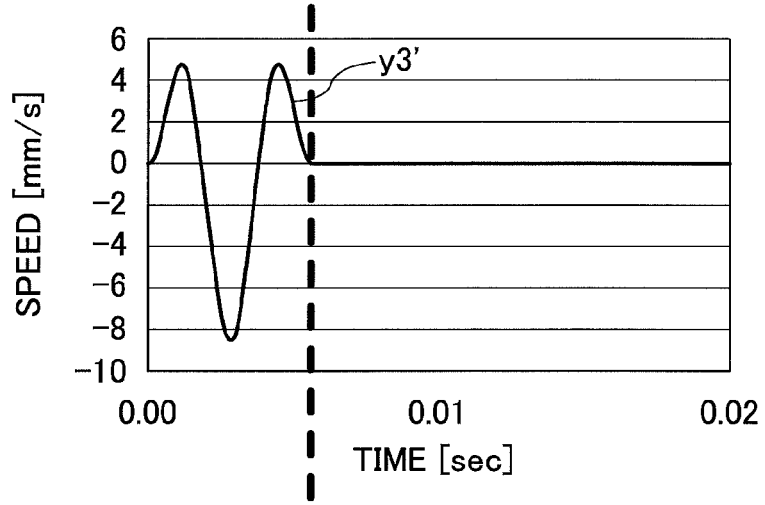
Figure 10C:
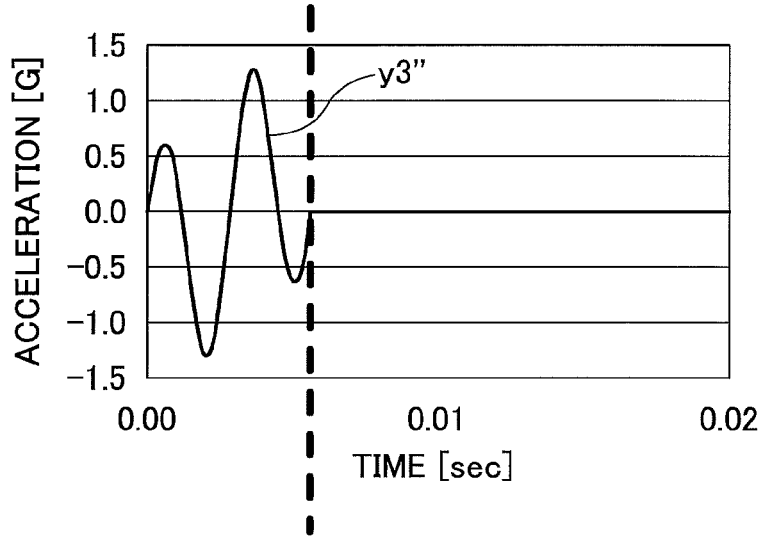

FIGS. 10A-10C are diagrams that illustrate an example of speed of vibration and acceleration of vibration of the LRA 140. FIG. 10A is a diagram that represents a waveform of the response displacement y3; FIG. 10B is a diagram that represents a waveform of the speed y3', which is the differential of the response displacement y3; and FIG. 10C is a diagram that represents a waveform of the acceleration y3", which is the second differential of the response displacement y3.

As can be seen in FIGS. 10A-10C, the waveform of the speed y3' and the waveform of the acceleration y3" become zero at the timing when the response displacement y3 becomes zero. In other words, the vibration of the LRA 140 stops at the timing T.

In this case, the waveform of the acceleration y3" stops in two cycles within 0.01 s. Therefore, in the example in FIGS. 10A-10C, the acceleration of the vibration becomes less than or equal to 0.02 G within 0.01 s, and the sense of clicking can be presented in response to a press on the button 2.

Note that m=2 and n=1 are assumed in the first embodiment, but the values are not limited to those. In the first embodiment, m and n just need to be natural numbers (excluding zero) and m≠n. Note that a preferable relationship between m and n is a relationship that satisfies m>n.

Figure 11A:
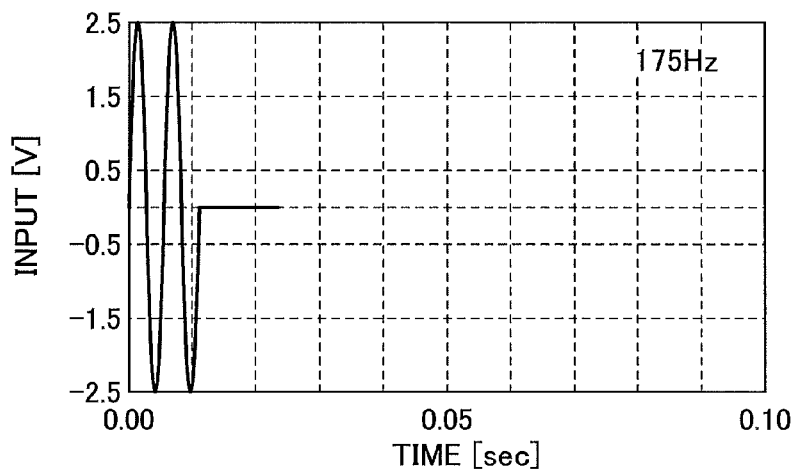
FIGS. 11A-11C are diagrams that illustrate acceleration of vibration of an LRA when a sine wave having the natural vibration frequency of the LRA is used as a drive signal.
Figure 11B:
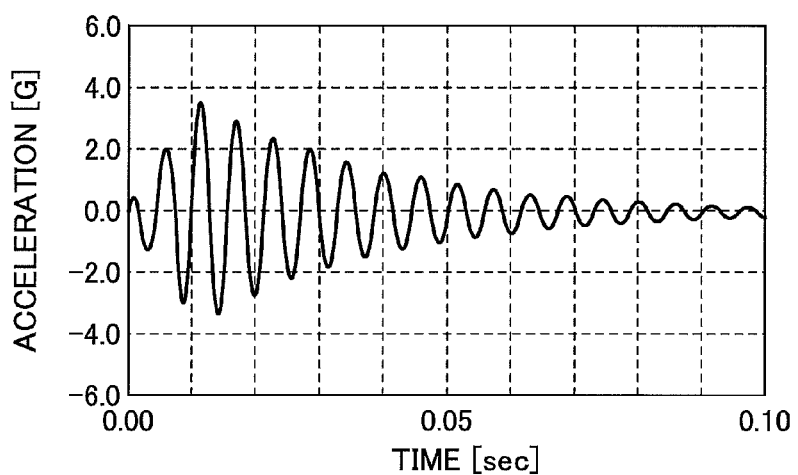
Figure 11C:
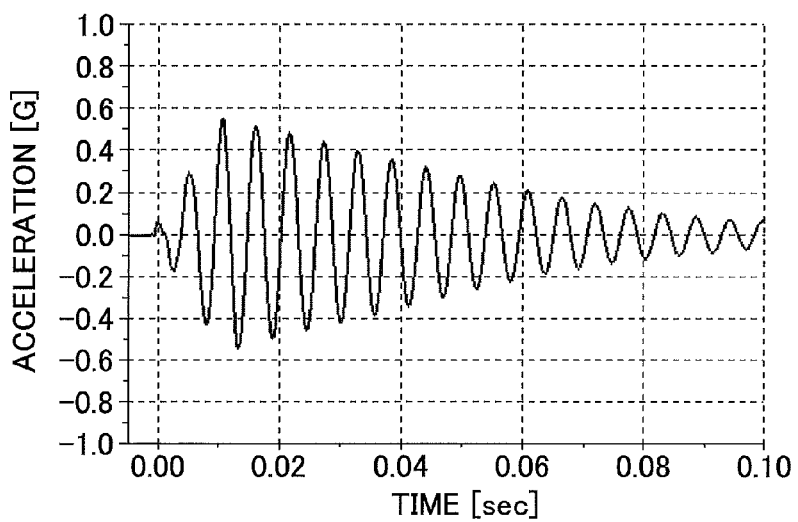

In the following, with reference to FIG. 11A to FIG. 14C, effects of the first embodiment will be described. FIGS. 11A-11C are diagrams that illustrate acceleration of vibration of the LRA 140 when a sine wave having the natural vibration frequency of the LRA 140 is given as the drive signal.

FIG. 11A illustrates a drive signal of a sine wave having the frequency 175 Hz, which is the same as the resonance frequency of the LRA 140 f0=175 Hz. FIG. 11B illustrates the acceleration of the vibration of the LRA 140 when a simulation is performed with the drive signal of the sine wave in FIG. 11A. FIG. 11C illustrates the acceleration of the vibration of the touch panel 120 when the drive signal in FIG. 11A is applied to the LRA 140 on an actual device that has the LRA 140 having the resonance frequency f0=175 Hz installed. Note that the acceleration of the touch panel 120 is detected by an accelerometer that is placed around the center of the touch panel 120.

As can be seen in FIGS. 11B and 11C, with the drive signal of the sine wave having the resonance frequency f0, the residual vibration appears for 0.1 s or longer.

Note that the LRA 140, to which the drive signal is applied in FIG. 11C, has the resonance frequency f0=175 Hz, the weight of 1.5 g, and the spring constant supporting the weight being 1813.5 N/m.

Figure 12A:
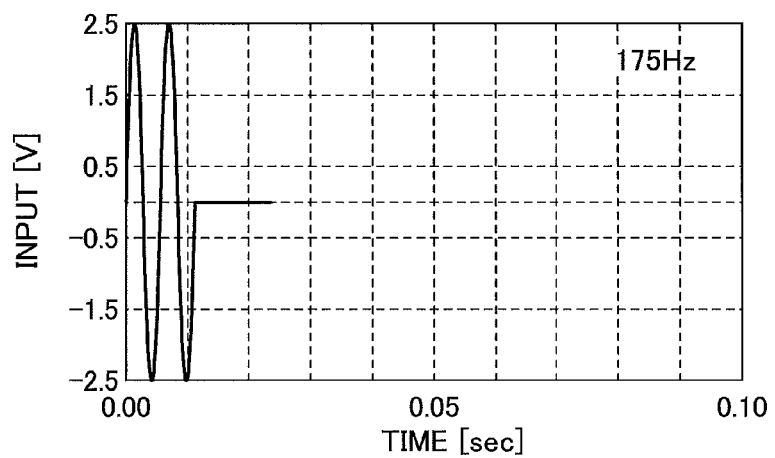
FIGS. 12A-12B are diagrams that illustrate acceleration of vibration of an LRA when a voltage is applied as a vibration check signal that has the opposite phase of the vibration generated on the LRA after a drive signal, which is a sine wave having the natural vibration frequency of the LRA, has been stopped.
Figure 12B:
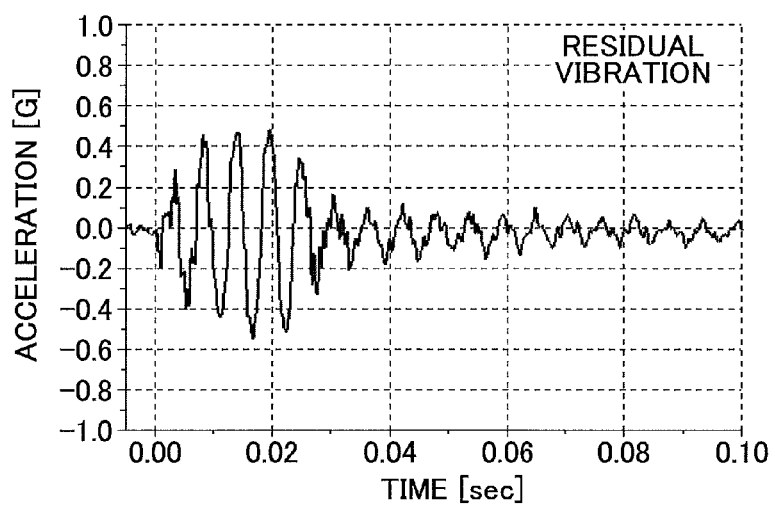

FIGS. 12A-12B are diagrams that illustrate acceleration of vibration of the LRA 140 when a voltage is applied as a vibration check signal that has the opposite phase of the vibration generated on the LRA 140 by a drive command. FIG. 12A illustrates a drive signal of a sine wave having the frequency equivalent to the resonance frequency of the LRA 140 f0=175 Hz. FIG. 12B illustrates the acceleration of the vibration of the touch panel 120 obtained by the drive signal of the sine wave in FIG. 12A on an actual device that has the LRA 140 installed, and the voltage is applied that has the opposite phase of the vibration generated on the LRA 140 after supply of the drive signal has been stopped.

In the example in FIGS. 12A-12B, although the residual vibration becomes smaller than that in FIGS. 11A-11C, it takes 0.05 s or longer until the acceleration of the vibration becomes less than or equal to 0.02 G, which is the lower limit of the perception of a human being.

Figure 13A:
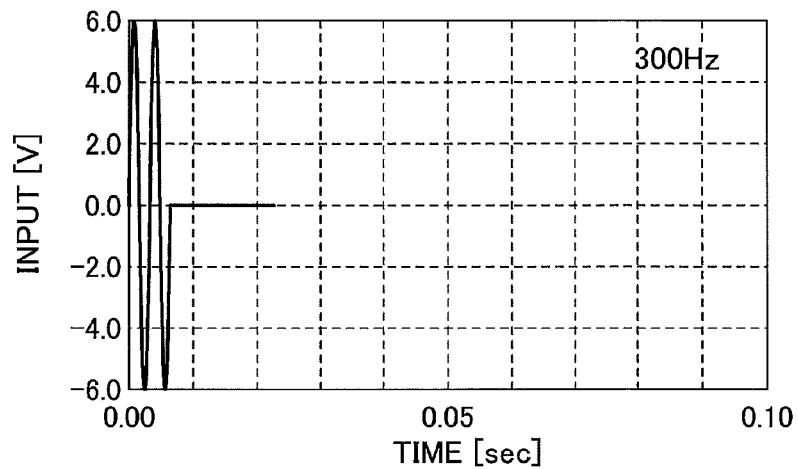
FIGS. 13A-13C are diagrams that illustrate acceleration of vibration of an LRA when a signal that does not satisfy a specific condition is used as a drive signal.
Figure 13B:
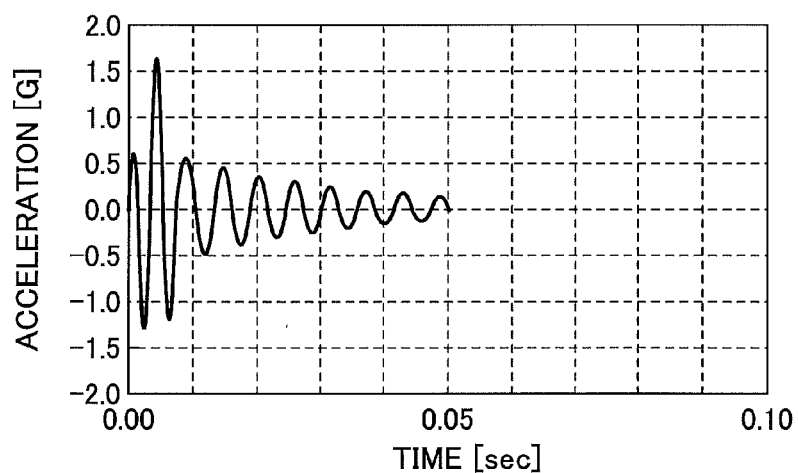
Figure 13C:
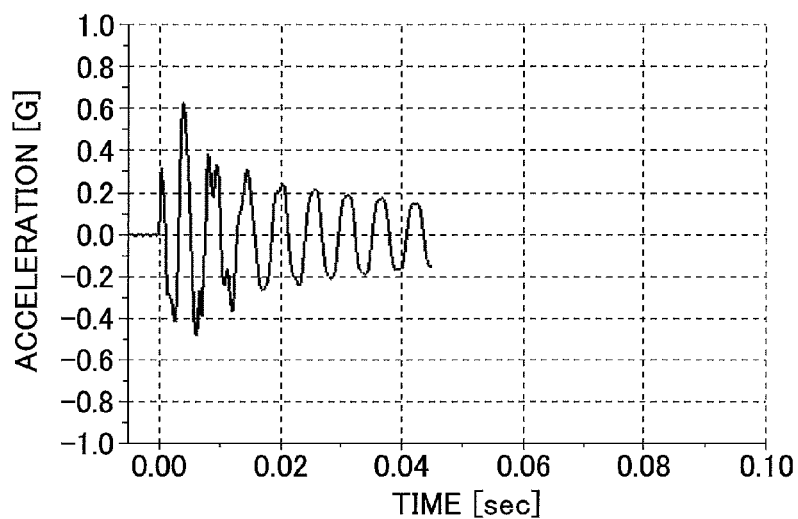

FIGS. 13A-13C are diagrams that illustrate acceleration of vibration of the LRA 140 when a signal that does not satisfy the specific condition is used as a drive signal.

FIG. 13A illustrates a drive signal of a sine wave having the frequency 300 Hz that does not satisfy the specific condition. FIG. 13B illustrates the acceleration of the vibration of the LRA 140 when a simulation is performed with the drive signal of the sine wave in FIG. 13A. FIG. 13C illustrates the acceleration of the vibration of the touch panel 120 when the drive signal in FIG. 13A is applied to the LRA 140 on an actual device that has the LRA 140 having the resonance frequency f0=175 Hz installed.

As can be seen in the example in FIGS. 13B-13C, with the drive signal of the sine wave having the frequency that does not satisfy the specific condition, the residual vibration appears for 0.04 s or longer.

Figure 14A:
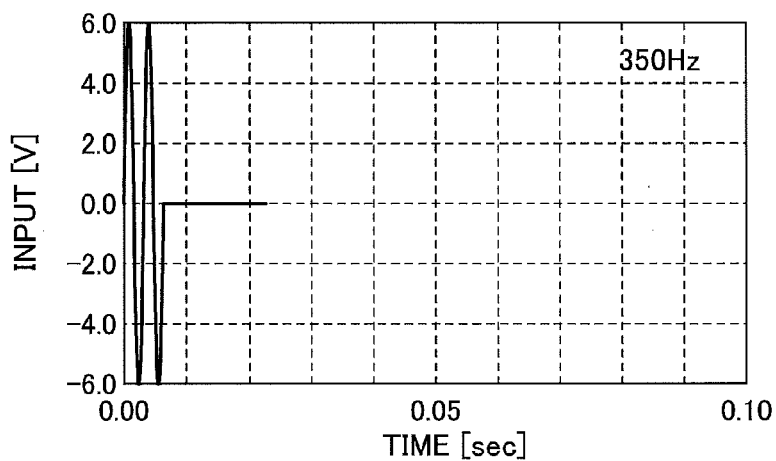
FIGS. 14A-14C are diagrams that illustrate acceleration of vibration of an LRA when a signal that satisfies a specific condition is used as a drive signal.
Figure 14B:
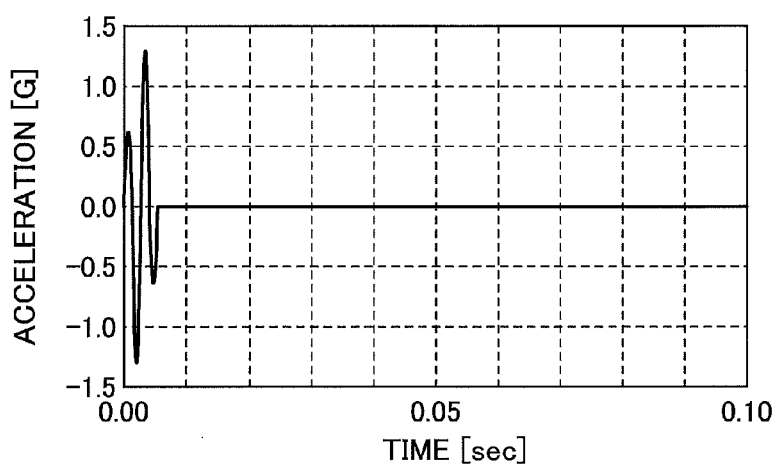
Figure 14C:
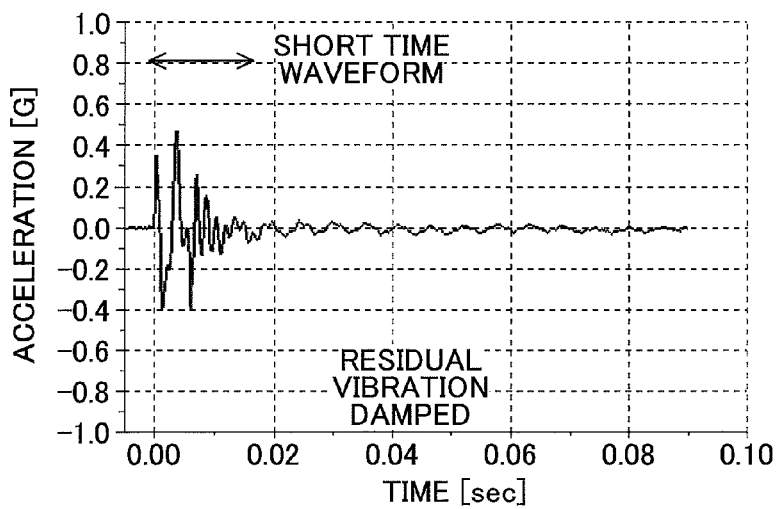

FIGS. 14A-14C are diagrams that illustrate acceleration of vibration of an LRA when a signal that satisfies the specific condition is used as a drive signal.

FIG. 14A illustrates a drive signal of a sine wave having the frequency 350 Hz that satisfies the specific condition. FIG. 14B illustrates the acceleration of the vibration of the LRA 140 when a simulation is performed with the drive signal of the sine wave in FIG. 14A. FIG. 14C illustrates the acceleration of the vibration of the touch panel 120 when the drive signal in FIG. 14A is applied to the LRA 140 on an actual device that has the LRA 140 having the resonance frequency f0=175 Hz installed.

As can be seen in the example in FIGS. 14B-14C, the acceleration of the residual vibration becomes less than or equal to 0.02 G, which is the lower limit of the perception, after 0.02 s, and the waveform of the vibration is a short time waveform.

As described above, the residual vibration can be eliminated in the waveform of the vibration by the LRA 140 by a drive signal that vibrates the LRA 140 m times at the frequency f1=((m/n)×f0) where f0 represents the resonance frequency of the LRA 140, m and n are natural numbers other than zero, and m≠n. Also, the waveform of the acceleration of the vibration of the touch panel 120 on an actual device having the LRA 140 installed damps steeply in one to several cycles, which is a short time waveform, and the sense of clicking can be presented.

Figure 15:
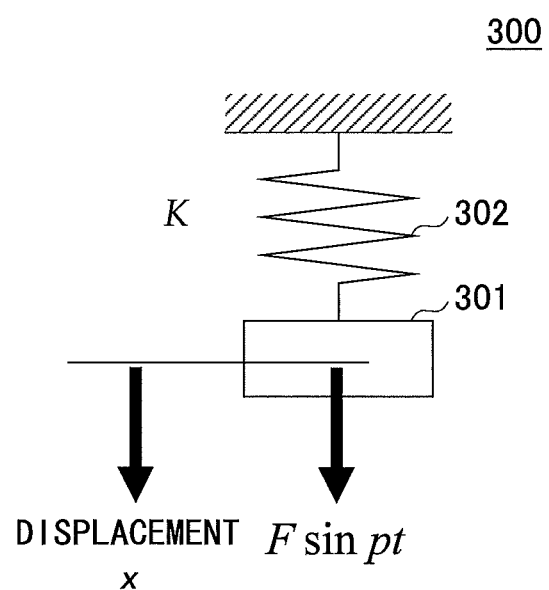
FIG. 15 is a diagram that illustrates a vibration system 300 including an object 301 and a spring 302.

Next, the displacement x of an object having the mass M illustrated in FIG. 15, will be considered. FIG. 15 is a diagram that illustrates a vibration system 300 including an object 301 and a spring 302.

The mass of the object 301 is M, and the object 301 is connected with the spring 302 at the lower end. The spring constant of the spring 302 is K. The upper end of the spring 302 is a fixed end, and the lower end of the spring 302 is a free end.

Note that the position of the object 301 in a state where the object 301 is suspended by the spring 302 without force being applied (balanced position) is set as the origin, and x represents the displacement of the object 301 with respect to the origin. The vertical downward direction is the positive direction of the displacement x.

Also, denoting the natural angular frequency of free vibration of the object 301 in the vibration system 300 by ω, the natural angular frequency ω is represented by the following Formula (3), and the frequency of the free vibration f0 is f0=ω/2π.

$$\omega = \sqrt{\frac{K}{M}} \quad (3)$$

A sinusoidal force (compelling force) Jsinpt is applied to the object 301 in this vibration system 300. Here, J represents the amplitude of the sinusoidal force, p represents the angular frequency of the compelling force, and t represents time. The forced vibration frequency f1 by the compelling force is f1=p/2π. The frequency f1 satisfies f1=(m/n)×f0 where m and n are natural numbers other than zero, and different from each other (m≠n).

By applying the forced vibration to the object 301 in this way, the displacement x of the object 301 is represented by the following Formula (4).

$$x = \frac{F}{m}\left(-\frac{p}{\omega(\omega^2 - p^2)}\sin\omega t + \frac{1}{(\omega^2 - p^2)}\sin pt\right) \quad (4)$$

The left term in the parentheses on the right-hand side of Formula (4) represents the free vibration component, the right component represents the forced vibration component. Note that the displacement x is zero at time t=0, and the speed x' is also zero.

As is obvious in Formula (4), the displacement x of the object 301 is represented by a composition of the free vibration component and the forced vibration component. This is similar to a case described by using FIG. 9 that by using the forced vibration component y1 and the free vibration component y2 of the vibration displacement generated when applying the drive signal Z to the LRA 140, the response displacement y3 when applying the drive signal Z to the LRA 140 is represented by the sum of the forced vibration component y1 and the free vibration component y2.

Figure 16:
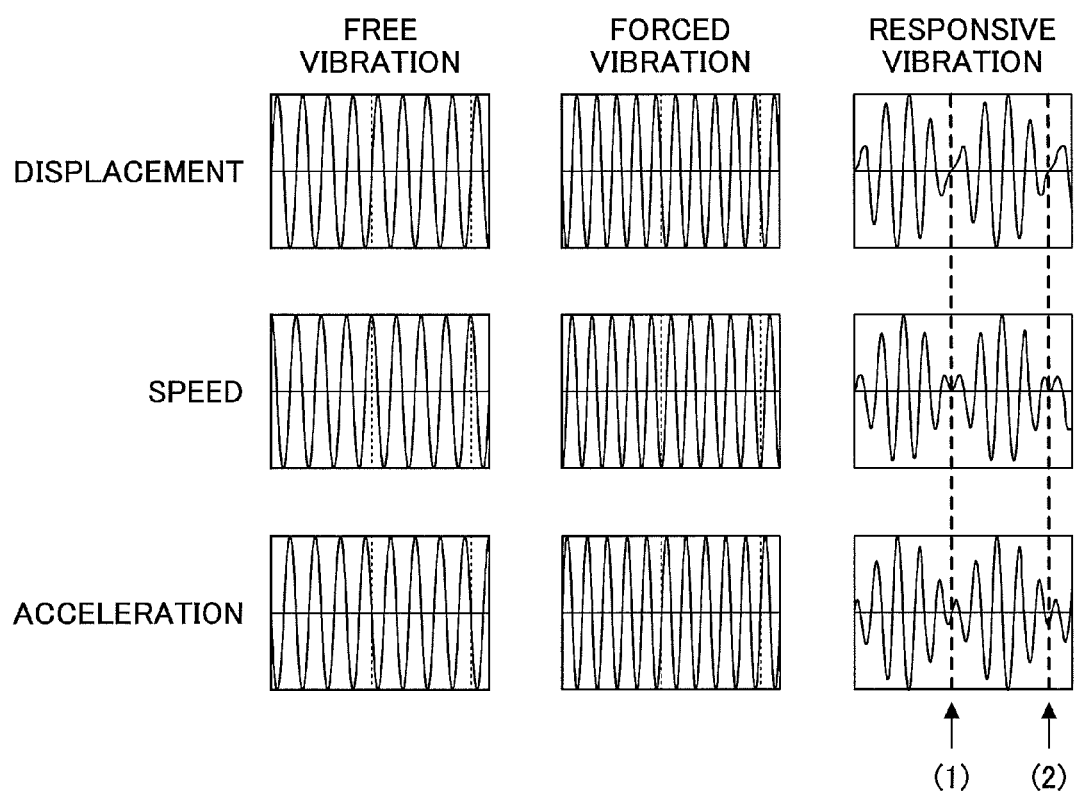
FIG. 16 is a diagram that illustrates displacement, speed, and acceleration of free vibration, forced vibration, and responsive vibration when the forced vibration Jsinpt is applied to the object 301.

Here, similar to the case described with FIGS. 14A-14C, if applying the forced vibration Jsinpt to the object 301 as a drive signal of a sine wave that satisfies the specific condition, the free vibration, forced vibration, and responsive vibration represented by Formula (4) are as illustrated in FIG. 16. The responsive vibration is given as composite vibration of the free vibration and the forced vibration.

FIG. 16 is a diagram that illustrates the displacement, speed, and acceleration of the free vibration, forced vibration, and responsive vibration when the forced vibration Jsinpt is applied to the object 301. The speed x' is represented by the first derivative of the displacement x, and the acceleration x" is represented by the second derivative of the displacement x.

Note that FIG. 16 illustrates waveforms in a case where forced vibration having the frequency f1=5/4×f0 (m=5 and n=4) is applied to the object 301.

As can be seen by the displacement, speed, and acceleration of the responsive vibration illustrated in FIG. 16, at timings (1) and (2) when the displacement x becomes zero, both the speed and the acceleration of the responsive vibration become zero. The timings (1) and (2) are timings when the vibration has been applied four times and eight times, respectively.

Here, consider whether there are any other timings when all of the displacement, speed, and acceleration of the responsive vibration become zero.

The displacement x represented by Formula (4), the speed x' as the first derivative of the displacement x, and the acceleration x" as the second derivative of the displacement x are represented by the following Formulas (5).

$$\begin{aligned} x &= \frac{F}{m}\frac{1}{\omega(\omega^2 - p^2)}(-p\sin\omega t + \omega\sin pt) \\ x' &= \frac{F}{m}\frac{p}{\omega^2 - p^2}(\cos pt - \cos\omega t) \\ x'' &= \frac{F}{m}\frac{p}{\omega^2 - p^2}(\omega\sin\omega t - p\sin pt) \end{aligned} \quad (5)$$

Condition for making both the displacement x and the acceleration x" represented by Formulas (5) become zero is obtained as the following Formulas (6).

$$\begin{cases} -p\sin\omega t + \omega\sin pt = 0 \\ \omega\sin\omega t - p\sin pt = 0 \end{cases} \quad (6)$$

$$\sin\omega t = \sin pt = 0$$

$$\begin{cases} \omega t = n\pi & n = 1, 2, \ldots \\ pt = m\pi & m = 1, 2, \ldots \end{cases}$$

$$n \neq m \quad (\omega \neq p)$$

-continued if
$$t = \frac{n\pi}{\omega}r = \frac{m\pi}{p}r$$
$$r = 1, 2, \ldots,$$
then $x = x'' = 0$
$$p = \frac{m}{n}\omega$$
$$\therefore f_1 = \frac{m}{n}f_0$$
$$t = \frac{2\pi}{p}\frac{m}{2}r$$

In other words, at $t=(n\pi/\omega)\times r=(m\pi/p)\times r$, if r is a natural number other than zero (r=1, 2 . . . ), both the displacement x and the acceleration x" become zero. Therefore, $p=(m/n)\times \omega$.

Thus, the condition represented by Formulas (6), namely, $f1=(m/n)\times f0$, and $t=(2\pi/p)\times(m/2)\times r$, are satisfied, both the displacement x and the acceleration x" become zero. In other words, when applying the vibration $((m/2)\times r)$ times, both the displacement x and the acceleration x" become zero.

Also, there are two cases where the speed x' in Formulas (5) becomes zero in addition to the displacement x and the acceleration x", as follows. The first case is obtained as the following Formula (7).

$$\cos pt = \cos t\omega \qquad (7)$$
if $t = \frac{n\pi}{\omega}r$
$r = 1, 2, \ldots,$
then $x = x' = 0$
if $\cos\frac{p}{\omega}n r\pi = \cos n r\pi \ (= \pm 1),$
then $x = x' = x'' = 0$
if $nr$ is odd,
$\frac{p}{\omega}nr = \frac{m}{n}nr = mr$ is odd
if $nr$ is even,
$mr$ is even
$\therefore$ if vibrating at $f_1 = \frac{m}{n}f_0,$
$x = x' = x'' = 0$
is obtained at
$$t = \frac{m\pi}{p}r = \frac{2\pi}{p}\frac{m}{2}r$$

Formula (7) is a condition that is derived from that cospt=cost$\omega$ is satisfied, which is included in the speed x'. By using $t=(n\pi/\omega)\times r$ (r=1, 2, . . . ), which is obtained during the course of obtaining Formulas (6), both the displacement x and the acceleration x" become zero when $\cos(p/\omega)$ $nr\pi=\cos nr\pi=\pm 1$.

Therefore, if nr is an odd number, it is necessary that $(p/\omega)nr=(m/n)nr\pi=mr$ is also an odd number. Conversely, if nr is an even number, it is necessary that $(p/\omega)nr=(m/n)$ $nr\pi=mr$ is also an even number.

Therefore, when vibrating the object 301 at $f1=(m/n)\times f0$, if $t=(ma\pi/p)\times r=(2\pi/p)\times(m/2)\times r$ represented by Formula (7) is satisfied, the speed x' becomes zero in addition to the displacement x and the acceleration x".

Therefore, the condition obtained from Formula (7) is that if r is an even number, vibrating the object 301 m times. This is similar to the condition illustrated in FIGS. 14A-14C. Also, if r is an odd number, the condition is that both n and m are even numbers, and vibrating the object 301 $((m/2)\times r)$ times.

Also, the second case where the speed x' in Formulas (5) becomes zero in addition to the displacement x and the acceleration x", is obtained as the following Formulas (8).

$$\cos pt = \cos t\omega = 0 \qquad (8)$$
$$pt = \frac{\pi}{2}(2k-1)$$
$$k = 1, 2, \ldots,$$
where $m$ is odd
$$\omega t = \frac{\pi}{2}(2l-1)$$
$$l = 1, 2, \ldots,$$
where $n$ is odd
if $t = \frac{\pi}{2p}(2k-1)\times r = \frac{\pi}{2\omega}(2l-1)\times r$
$r = 1, 2, \ldots,$
then $x' = 0$
$$p = \frac{2k-1}{2l-1}\omega$$
$$\therefore f_1 = \frac{2k-1}{2l-1}f_0$$
$$t = \frac{2\pi}{p}\frac{2k-1}{4}r$$

Formulas (8) are a condition that is derived from that cospt=cost$\omega$=0 is satisfied, which is included in the speed x'. Here, by using any natural numbers k and l other than zero, cospt=cost$\omega$=0 is satisfied if $pt=(\pi/2)\times(2k-1)$, and $\omega t=(\pi/2)\times(2l-1)$.

Here, (2k-1) represents that m is an odd number, and (2l-1) represents that n is an odd number.

In other words, if $t=(\pi/2p)\times(2k-1)\times r=(\pi/2\omega)\times(2l-1)\times r$ is satisfied, cospt=cost$\omega$=0 is satisfied. However, r is a natural number other than zero (r=1, 2, . . . ). This leads to $p=\omega\times(2k-1)/(2l-1)$.

Therefore, $f1=\{(2k-1)/(2l-1)\}\times f0$, and $t=(2\pi/p)\times\{(2k-1)/4\}\times r$, are obtained as represented in Formulas (8). These represent vibrating the object 301 $((m/4)\times r)$ times.

Therefore, the condition obtained by Formulas (8) is that both n and m are odd numbers, and vibrating the object 301 $((m/2)\times r)$ times at the frequency f1. Note that this condition includes the condition obtained by Formula (7) that if r is an odd number, both n and m are even numbers, and vibrating the object 301 $((m/2)\times r)$ times.

Thus, the cases where the speed x' in Formulas (5) becomes zero in addition to the displacement x and the acceleration x" are: vibrating the object 301 m times at the frequency f1 if r is an even number; and vibrating the object 301 $((m/2)\times r)$ times at the frequency f1 if both n and m are odd numbers. Among these, the former is the same as the condition illustrated in FIGS. 14A-14C. Therefore, the latter condition is newly obtained here. The latter condition is vibrating the object 301 $((m/2)\times r)$ times at the frequency f1 if both n and m are odd numbers. This condition will be described using FIG. 17.

Figure 17:
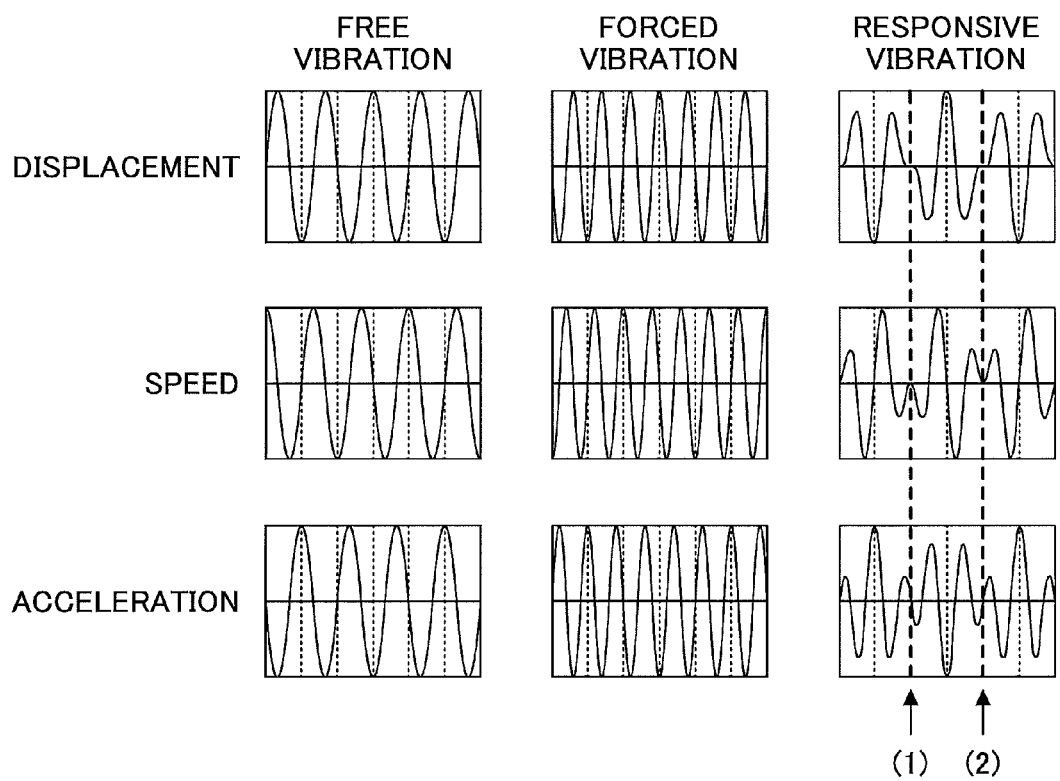
FIG. 17 is a diagram that illustrates displacement, speed, and acceleration of free vibration, forced vibration, and responsive vibration, when vibrating the object 301 ((m/2)× r) times at a frequency f1 when both n and m are odd numbers.

FIG. 17 is a diagram that illustrates the displacement, speed, and acceleration of the free vibration, forced vibration, and responsive vibration, when vibrating the object 301 ((m/2)×r) times at the frequency f1 when both n and m are odd numbers. FIG. 17 illustrates waveforms in a case where forced vibration having the frequency f1=5/3 f0 (m=5 and n=3) is applied to the object 301. Timings (1) and (2) are timings when the vibration has been applied 5/2 times and five times, respectively.

As illustrated in FIG. 17, at the timing (1) by which the vibration has been applied 5/2 times, all the displacement, speed, and acceleration of the responsive vibration become zero. Also, at the timing (2) by which the vibration has been applied five times, all the displacement, speed, and acceleration of the responsive vibration become zero. The timing (2) corresponds to a case where the m and n are odd numbers in the operational conditions illustrated in FIGS. 14A-14C.

As above, according to the first embodiment, it is possible to have all the displacement, speed, and acceleration of the responsive vibration become 0 if n and m are positive odd numbers, and by vibrating the object 301 ((m/2)×r) times at the frequency f1 (=(m/n)×f0), where r is a natural number other than zero, or r=1, 2, . . . .

Therefore, by storing waveform data in the memory 220 that vibrates the object 301 ((m/2)×r) times at the frequency f1 (=(m/n)×f0) if both n and m are odd numbers, as the waveform data 240 that represents a drive signal to drive the LRA 140, the sense of clicking can be presented by vibration generated by the LRA 140 when operating on the touch panel 120.

The sense of clicking presented at the timing (1) illustrated in FIG. 17 is realized in a vibration period that is half of that of the sense of clicking presented at the timing (2), and hence, a more sharp sense of clicking can be presented.

Figure 18:
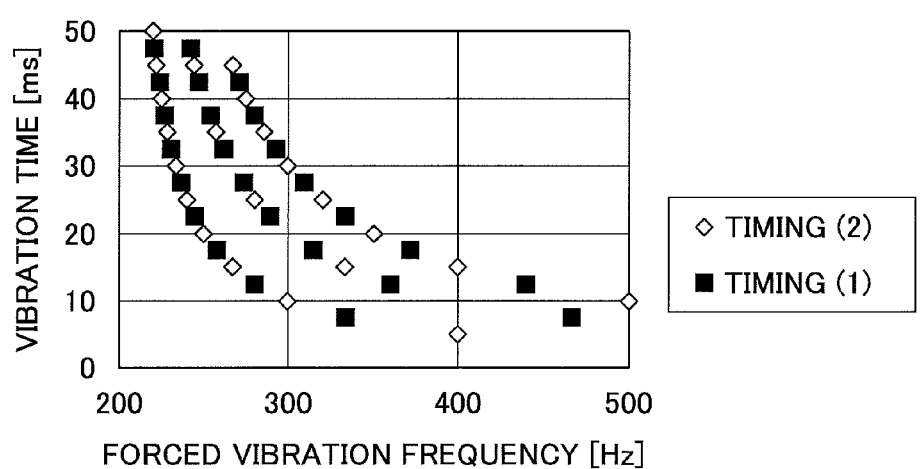
FIG. 18 is a diagram that illustrates a relationship between forced vibration frequency and vibration time.

FIG. 18 is a diagram that illustrates a relationship between the forced vibration frequency and the vibration time. FIG. 18 illustrates operational points of the timing (1) and operational points of the timing (2) illustrated in FIG. 17.

As described above, the sense of clicking presented at the timing (1) is realized in a vibration period that is half of that of the sense of clicking presented at the timing (2). Therefore, if setting the forced vibration frequency between 200 Hz and 500 Hz, the operational points of the timing (1) are obtained as if interpolating in-between the operational points of the timing (2). Such interpolation by the operational points of the timing (1) in this way is advantageous because the operational points of the timing (2) become more discrete at higher frequencies, especially.

When setting a forced vibration frequency on an actual electronic device 100, constraints need to be considered, including the natural vibration frequency of the touch panel 120, and operational points at high frequencies, Therefore, practically selectable operational points are limited.

However, operational points of the timing (1) are obtained as if interpolating in-between the operational points of the timing (2). Therefore, it has an effect that alternatives for the forced vibration frequency to be set increase.

Incidentally, if the damping of the free vibration of the LRA 140 is comparatively great, one of the displacement, speed, and acceleration of the responsive vibration may not become zero at the timings (1) and (2) by the drive signal described above.

Thereupon, in the following, the damping of the free vibration of the LRA 140 is considered to have all the displacement, speed, and acceleration of the responsive vibration become zero.

Figure 19:
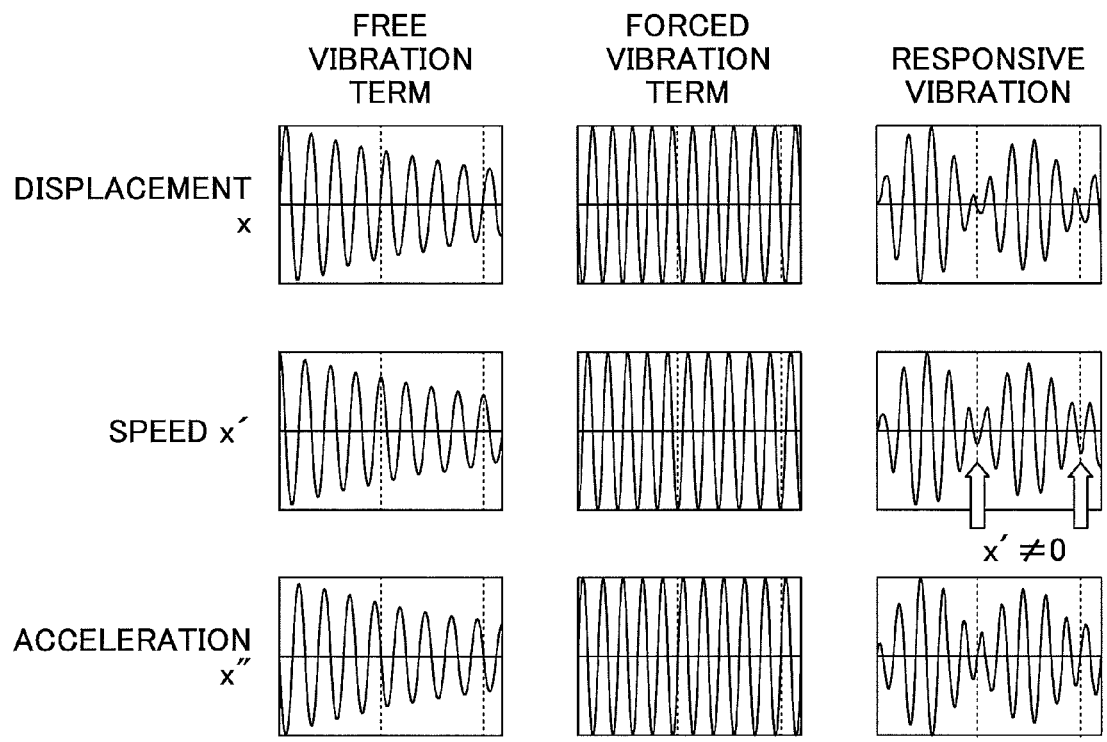
FIG. 19 is a diagram that illustrates displacement, speed, and acceleration of free vibration, forced vibration, and responsive vibration, when vibrating the object 301 ((m/2)× r) times at a frequency f1 when both n and m are odd numbers.

FIG. 19 is a diagram that illustrates the displacement, speed, and acceleration of the free vibration, forced vibration, and responsive vibration, when the damping of the free vibration of the LRA 140 is comparatively great.

Compared to the free vibration illustrated in FIG. 16 (no damping), the displacement x of the free vibration of the LRA 140 illustrated in FIG. 19 damps with time. Therefore, the speed x' and the acceleration x" also damp with time.

In this way, if the damping of the free vibration is comparatively great, for example, the speed of the response vibration x' may not become zero at the timing (1) and (2). This is because although the free vibration of the LRA 140 damps, the forced vibration remains as the same as the waveform illustrated in FIG. 16, and hence, the waveform of the responsive vibration, which is composed of the free vibration and the forced vibration, exhibits a waveform different from the waveform illustrated in FIG. 16.

Since the damping rate is common among the displacement, speed, and acceleration, the damping rate of the free vibration is obtained based on the acceleration of the free vibration in the first embodiment. The reason why the damping rate of the free vibration is obtained based on the acceleration of the free vibration is that among the displacement, speed, and acceleration of the free vibration, the acceleration can be measured comparatively simply by an accelerometer. Also, the characteristic of the sensory organ of a human being matches an acceleration sensor. For example, the acceleration of the free vibration can be obtained in a measurement system 400 illustrated in FIG. 20.

Figure 20:
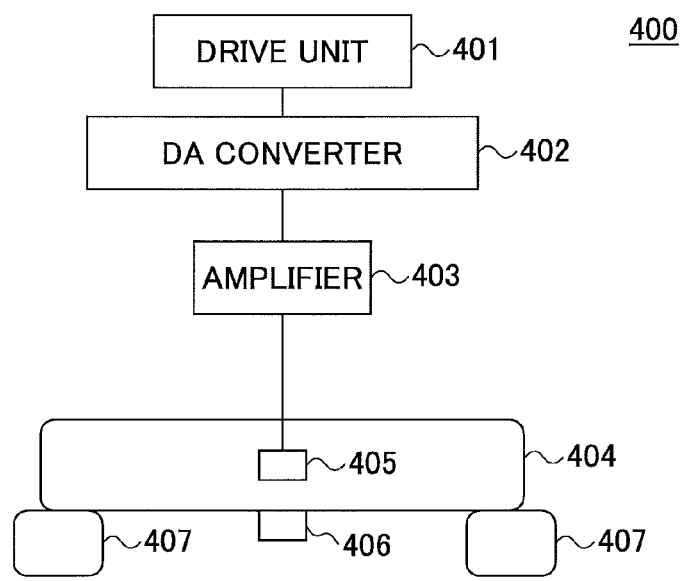
FIG. 20 is a diagram that illustrates a measurement system 400 that measures acceleration of free vibration.

FIG. 20 is a diagram that illustrates the measurement system 400 that measures the acceleration of the free vibration. The measurement system 400 includes a drive unit 401, a DA (Digital to Analog) converter 402, an amplifier 403, a weight 404, a vibrator 405, an accelerometer 406, and a sponge 407.

The drive unit 401 stores predetermined waveform data, and outputs a drive signal represented by the waveform data to the DA converter 402. Note that it is desirable that the predetermined waveform data is the waveform data 240 that realizes the forced vibration.

The weight 404 may be a weight having the weight equivalent to that of the touch panel 120 if the touch panel 120 is attached to the LRA 140 on an actual electronic device 100 as illustrated in FIG. 3. Note that instead of the weight 404, a member that is actually attached to the LRA 140 may be used. If the touch panel 120 is attached to the LRA 140 as illustrated in FIG. 3, the touch panel 120 may be used instead of the weight 404.

The weight 404 has the vibrator 405 attached around the center of it, and the weight 404 also has the accelerometer 406 attached. End parts of the weight 404 are installed on a platform or the like via the sponge 407.

In this measurement system 400, the drive signal is output to the DA converter 402 by the drive unit 401, the drive signal is converted into an analog signal by the DA converter 402, and amplified by the amplifier 403 to be input into the vibrator 405. The vibrator 405 may be, for example, an LRA.

The vibrator 405 is driven by the drive signal that is supplied from the amplifier 403, and the weight 404 vibrates. Then, the damping characteristic of the free vibration of the LRA 140 can be obtained by measuring the free vibration of the LRA 140 by the accelerometer 406 after having the drive signal turned off.

FIGS. 21A-21B are diagrams that illustrate damping of acceleration of free vibration. For example, if driving the vibrator 405 starts at t=0 second, and the drive signal is stopped at t=0.04 s, a waveform only including the free vibration is obtained after t=0.04 s as illustrated in FIG. 21A. By measuring the damping of this free vibration by the accelerometer 406, data of an envelope 410 can be obtained that is designated by a thick line in FIG. 21A, and represents the damping characteristic of the free vibration. Note that the envelope 410 can be obtained by using, for example, Hilbert transformation.

The envelope 410 illustrated in FIG. 21A is represented by $h=e^{-\sigma t}$ where $-\sigma$ is a coefficient that represents the damping rate. The formula ($h=e^{-\sigma t}$) that represents the envelope 410 represents the damping characteristic.

By showing the envelope 410 illustrated in FIG. 21A with a semilogarithmic scale, the characteristic in FIG. 21B is obtained. The slope of an envelope 420 illustrated in FIG. 21B is $-\sigma$.

In the first embodiment, by multiplying the displacement x, the speed x', and the acceleration x" of the responsive vibration by the damping characteristic obtained in this way, an operational point is obtained with which all the displacement x, the speed x', and the acceleration x" of the responsive vibration become zero.

Specifically, the waveform data 240 that represents a drive signal obtained by multiplying the drive signal Z=A sin 2πf1t by the damping characteristic $h=e^{-\sigma t}$, is stored in the memory 220, and the LRA 140 is driven by using the drive signal having this damping characteristic multiplied.

The drive signal Z1 having this damping characteristic multiplied is represented by the following formula.

$$Z1=A(e^{-\sigma t})\sin 2\pi f1 t$$

Figure 22:
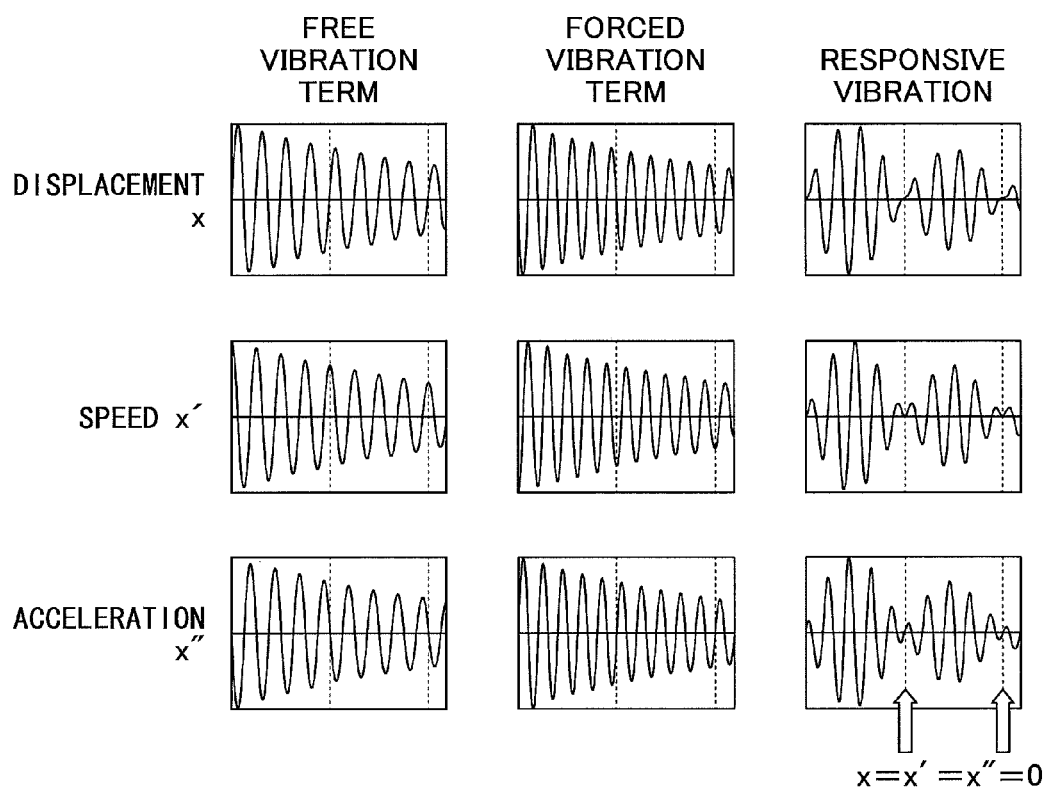
FIG. 22 is a diagram that illustrates displacement, speed, and acceleration of free vibration, forced vibration, and responsive vibration when driving an LRA 140 by a drive signal Z1.

The displacement, speed, and acceleration of the responsive vibration obtained when driving the LRA 140 by using this drive signal Z1 are as illustrated in FIG. 22.

FIG. 22 is a diagram that illustrates the displacement, speed, and acceleration of the free vibration, forced vibration, and responsive vibration when driving the LRA 140 by the drive signal Z1.

As illustrated in FIG. 22, all the displacement x, speed x', and acceleration x" of the responsive vibration become zero both at the timings (1) and (2).

FIGS. 23A-23B are diagrams that illustrate differences of the residual vibration with and without a damping characteristic. FIGS. 23A-23B illustrate the acceleration of vibration by a drive signal obtained with m=5 and n=4.

FIG. 23A illustrates the acceleration of free vibration that is generated by inputting the drive signal Z not having the damping characteristic multiplied (=A sin 2πf1t), and turning off the drive signal Z at time t1.

FIG. 23B illustrates the acceleration of free vibration that is generated by inputting the drive signal Z1 having the damping characteristic multiplied (=$A(e^{-\sigma t})$sin 2πf1t), and turning off the drive signal Z1 at time t1.

As can be seen by comparing FIG. 23A and FIG. 23B, after time t1, comparatively greater residual vibration remains in FIG. 23A, whereas virtually no residual vibration is generated in FIG. 23B. The acceleration after time t1 in FIG. 23B is less than or equal to 0.02 G, which is a level that cannot be perceived by a human being.

Thus, according to the first embodiment, even if the damping of the free vibration is comparatively great, by having the drive signal include the damping rate that represents the damping characteristic of the free vibration, a timing can be securely obtained at which all the displacement x, speed x', and acceleration x" of the responsive vibration become zero.

Therefore, by using a drive signal that includes the damping rate representing the damping characteristic of the free vibration, as the waveform data 240 that represents the drive signal driving the LRA 140, the sense of clicking can be presented by the vibration generated by the LRA 140.

The drive signal before having the damping rate representing the damping characteristic of the free vibration included may be, for example, one of the following two.

First, a signal that vibrates the LRA 140 m times at the frequency f1=((m/n)×f0) where f0 represents the resonance frequency of the LRA 140, and m and n are natural numbers other than zero, and m≠n, can be used as the drive signal. In this case, the vibration is as illustrated in FIGS. 14A-14C.

Alternatively, a drive signal representing waveform data that vibrates ((m/2)×r) times at the frequency f1 (=(m/n)×f0) where both n and m are odd numbers, may be used as the waveform data 240 that represents the drive signal driving the LRA 140. In this case, the vibration is as illustrated in FIG. 17.

Note that although the drive signal is assumed to be a sine wave in the above description, the drive signal is not limited to a sine wave, but may have a waveform other than a sine wave such as a rectangular wave.

Also, although the electronic device 100 in the first embodiment is assumed to have the LRA 140 attached on a housing-side surface of the touch panel 120, it is not limited to that. The LRA 140 may be placed, for example, around the substrate 150 that is disposed in the housing 110.

Figure 24:
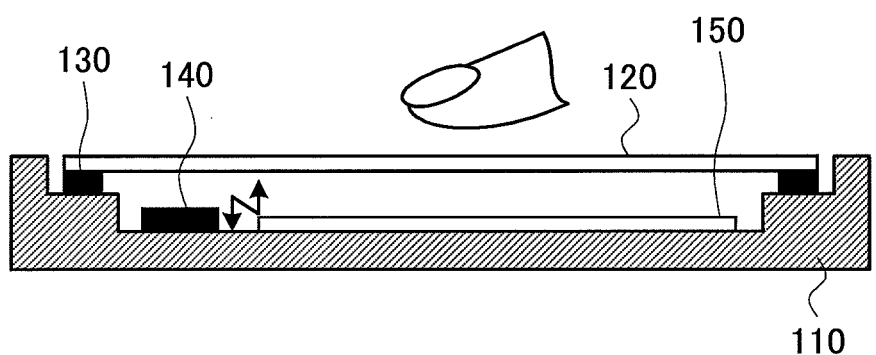
FIG. 24 is a diagram that illustrates an example of an electronic device having an LRA disposed in the housing.

FIG. 24 is a diagram that illustrates an example of an electronic device 100A having the LRA 140 disposed in the housing. The electronic device 100A illustrated in FIG. 24 has the LRA 140 placed around the substrate 150 that is disposed in the housing 110. The first embodiment is applicable to the electronic device 100A. Also, if the first embodiment is applied to the electronic device 100A, similar to the electronic device 100 in the first embodiment, the sense of clicking can be presented when pressing the metal-dome button 2.

In the above description, four drive conditions have been described as drive conditions of the LRA 140 that can reduce the residual vibration as follows.

The first drive condition is to vibrate the LRA 140 m times by a drive signal that includes the frequency f1=(m/n)×f0 where f0 is the resonance frequency of the LRA 140, if m and n are natural numbers other than zero, and m≠n.

Also, the second drive condition is to vibrate the LRA 140 ((m/2)×r) times by a drive signal that includes the frequency f1=(m/n)×f0 where f0 is the resonance frequency of the LRA 140 and r is a natural number other than zero, or r=1, 2, . . . , if n and m are positive odd numbers different from each other.

Also, the third drive condition is to use the drive signal in the first drive condition multiplied by the damping characteristic obtained by the damping rate of the vibration system having the LRA 140 mounted. In other words, the third drive condition is to vibrate the LRA 140 m times by a drive signal that includes the frequency f1=(m/n)×f0, and is multiplied by the damping characteristic obtained by the damping rate of a vibration system having the LRA 140 mounted, where f0 is the resonance frequency of the LRA 140, if m and n are natural numbers other than zero, and m≠n.

Also, the fourth drive condition is to use the drive signal in the second drive condition multiplied by the damping characteristic obtained by the damping rate of the vibration system having the LRA 140 mounted. In other words, the fourth drive condition is to vibrate the LRA 140 ((m/2)×r) times by a drive signal that includes the frequency f1=(m/ n)×f0, and is multiplied by the damping characteristic obtained by the damping rate of a vibration system having the LRA 140 mounted, where f0 is the resonance frequency of the LRA 140 and r is a natural number other than zero, or r=1, 2, . . . , if n and m are positive odd numbers different from each other.

However, if the resonance frequency of the LRA 140 has a characteristic that varies depending on the acceleration amplitude, the residual vibration may not be completely reduced by any of the four drive signals described above. A characteristic of the resonance frequency that varies depending on the acceleration amplitude is, for example, a characteristic of the resonance frequency that shifts to a higher frequency while the acceleration amplitude increases. The acceleration amplitude is a synonym of the acceleration, and the unit of measure is m/s2 or G (Gravity).

Figure 25:
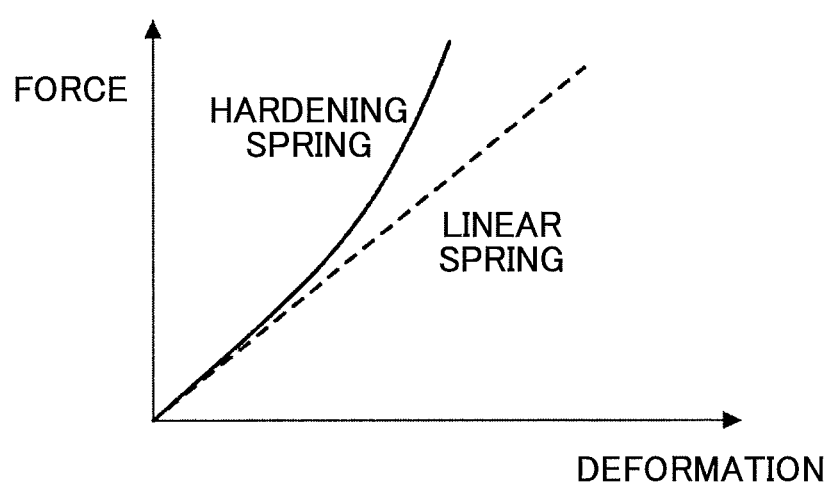
FIG. 25 is a diagram that illustrates deformation characteristics of a hardening spring and a linear spring.

This characteristic is analogous to a non-linear deformation characteristic of a hardening spring. FIG. 25 is a diagram that illustrates deformation characteristics of a hardening spring and a linear spring. In FIG. 25, the horizontal axis represents deformation, and the vertical axis represents force applied to a hardening spring and a linear spring. Note that in FIG. 25, the solid line designates the deformation characteristic of the hardening spring, and the dashed line designates the deformation characteristic of the linear spring.

As designated by the dashed line in FIG. 25, the deformation of the linear spring increases linearly while the force increases. In contrast to this, as designated by the solid line, the deformation of the hardening spring becomes less while the force increases. As such, the hardening spring has a non-linear deformation characteristic.

Figure 26:
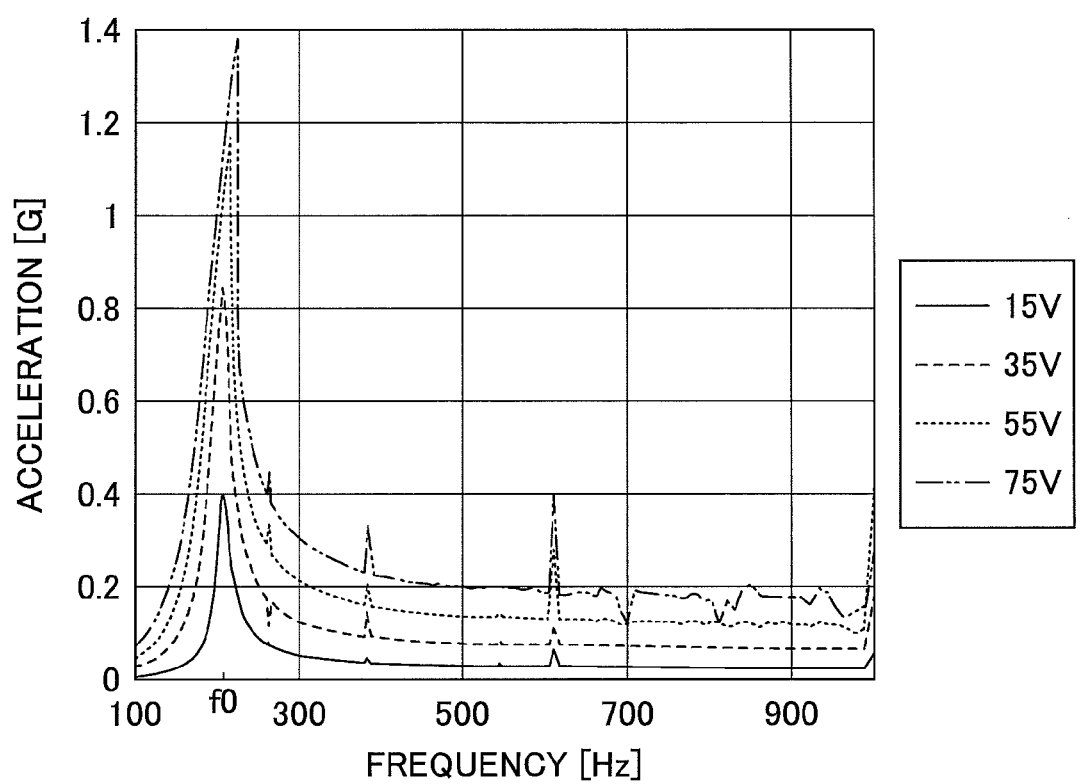
FIG. 26 is a diagram that illustrates a characteristic of a resonance frequency that varies depending on acceleration amplitude.
Figure 27:
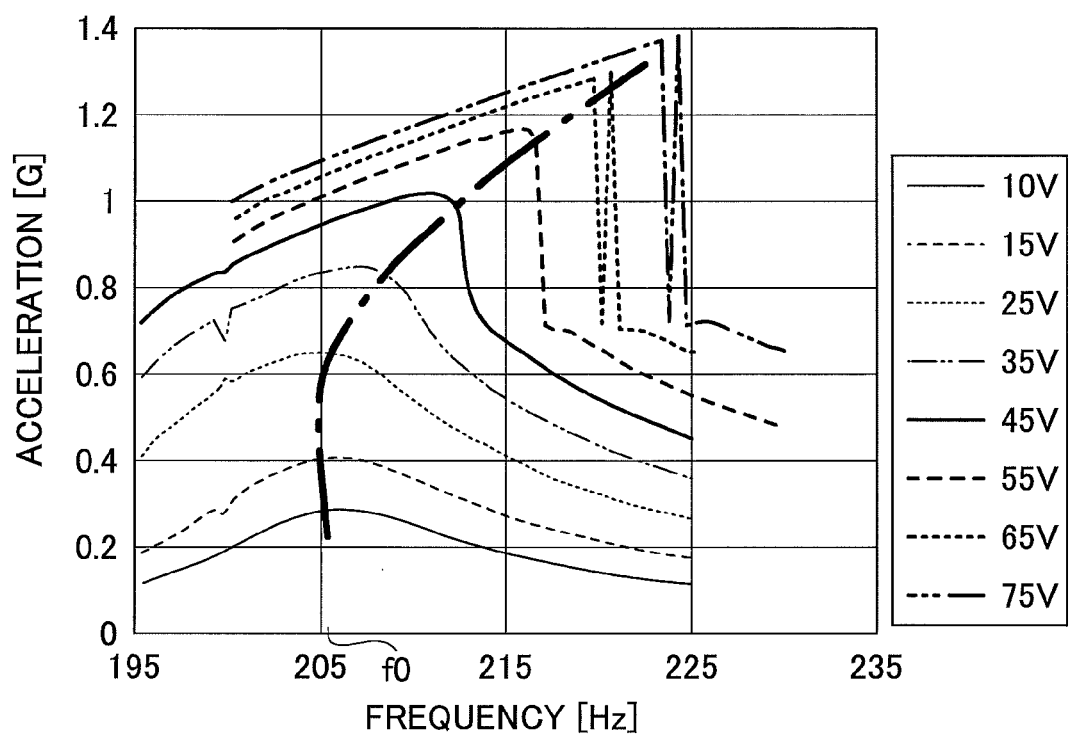
FIG. 27 is a diagram that illustrates a characteristic of a resonance frequency that varies depending on acceleration amplitude.

FIG. 26 and FIG. 27 are diagrams that illustrate a characteristic of the resonance frequency that varies depending on the acceleration amplitude. Here, a case will be described where the resonance frequency of the LRA 140 varies depending on the acceleration amplitude as illustrated in FIG. 26 and FIG. 27. The LRA 140 may have such a characteristic if the deformation with respect to stress is not linear, or non-linear, for example, due to its thin shape or the like as a result of downsizing the LRA 140.

Assuming that the rated value of the resonance frequency of the LRA 140 is f0, by setting the drive voltage of the LRA 140 to one of 15 V, 35 V, 55 V, and 75 V, and changing the frequency, a corresponding one of the frequency characteristics illustrated in FIG. 26 is obtained.

The frequency at which the acceleration takes the peak in the frequency characteristics is the resonance frequency. As illustrated in FIG. 26, while the drive voltage becomes higher and the acceleration (the amplitude of the acceleration) becomes greater, the peak of the frequency characteristic shifts to higher frequencies.

FIG. 27 is a diagram that enlarges a part of FIG. 26, and illustrates the frequency characteristics of the drive voltage set to 10 V, 15 V, 25 V, 35 V, 45 V, 55 V, 65 V, and 75 V, respectively. As illustrated in FIG. 27, while the drive voltage becomes higher and the acceleration becomes greater, the frequency characteristic f0 shifts to higher frequencies as designated by the bold dotted dashed line.

The reason why the frequency characteristic f0 shifts to higher frequencies while the acceleration increases in this way can be inferred that the LRA 140 has a deformation characteristic like that of a hardening spring, with which the deformation becomes less at higher frequencies, and the resonance frequency becomes higher.

Also, the acceleration decreases steeply in FIG. 27 when the frequency goes over the resonance frequency, especially for the drive voltage of 55 V or higher. This is a jump phenomenon of non-linear vibration in which the value of the acceleration jumps discontinuously at a border of a certain frequency in this way, and an undefined state of the acceleration is generated.

Here, for example, if the rated value of the resonance frequency of the LRA 140 is 225 Hz, a shift of the resonance frequency may exist actually due to a manufacturing error and the like. Therefore, by using FIGS. 28A-28D, a drive signal and the displacement of the responsive vibration will be described in which the drive signal vibrates the LRA 140 five times. The drive signal is obtained from a drive signal having the frequency f1=(5/4)×f0 multiplied by the damping characteristic where f0 is the resonance frequency is set to 205 Hz, 210 Hz, 215 Hz, or 225 Hz. In other words, FIGS. 28A-28D illustrate the displacement of the responsive vibration under the third drive condition among the four drive conditions described above where m=5, n=4, and the resonance frequency f0 is set to 205 Hz, 210 Hz, 215 Hz, or 225 Hz.

FIGS. 28A-28D are diagrams that illustrate the waveforms of the drive signals and the displacement of the responsive vibrations of the LRA 140. FIGS. 28A, 28B, 28C, and 28D illustrate waveforms of the resonance frequencies f0 set to 205 Hz, 210 Hz, 215 Hz, and 225 Hz, respectively. Also, in FIGS. 28A-28D, a waveform of the drive signal is designated by a dashed lines, and the displacement of the responsive vibration is designated by a solid line. Note that the displacement of the responsive vibration illustrated in FIGS. 28A-28D is obtained in a case where the resonance frequency of the LRA 140 has a characteristic that varies depending on the acceleration amplitude. Also, the displacement of the responsive vibration illustrated in FIGS. 28A-28D is obtained in a state where the touch panel 120 has the LRA 140 attached as illustrated in FIG. 3.

Figure 28A:
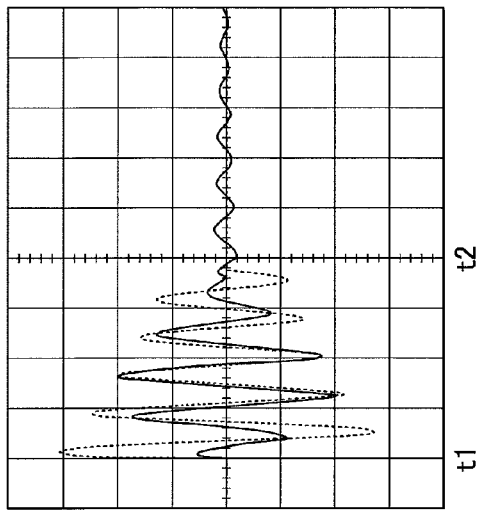
FIGS. 28A-28D are diagrams that illustrate waveforms of drive signals and displacement of responsive vibrations of an LRA 140.
Figure 28B:
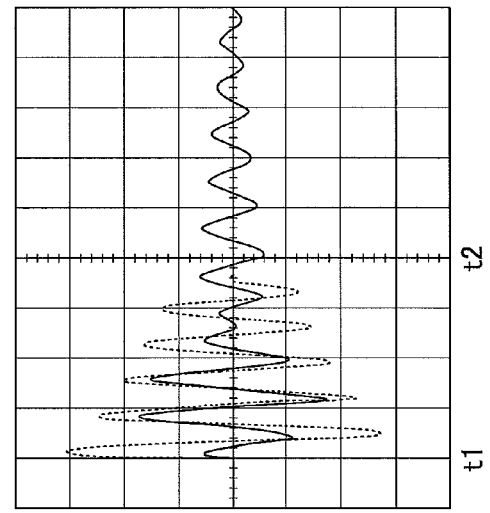
Figure 28C:
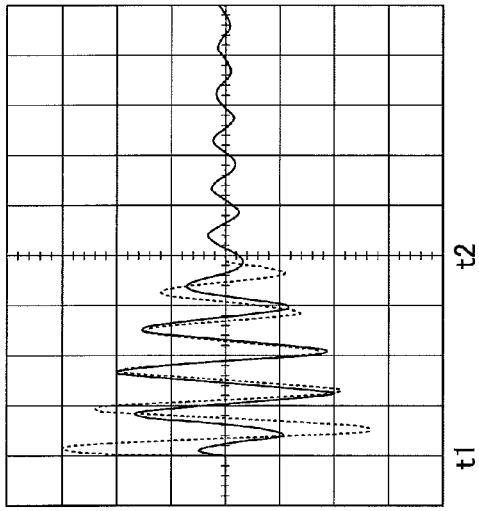
Figure 28D:
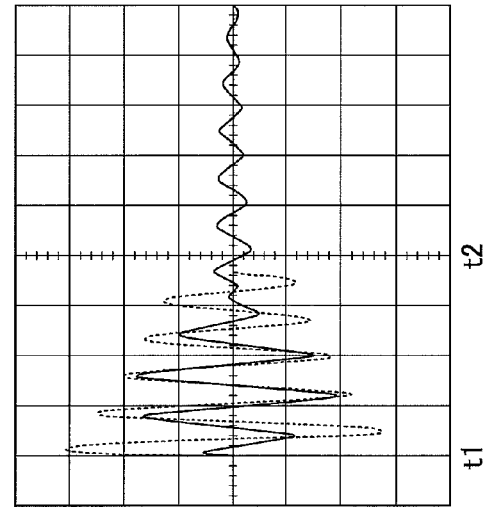

As illustrated in FIG. 28A, by inputting the drive signal having the frequency of 205 Hz×(5/4) and the damping characteristic into the LRA 140 for five cycles starting at time t1, the displacement of the responsive vibration exhibits the residual vibration after time t2 at which the drive signal is turned off. This implies that a point is not generated at which the displacement, speed, and acceleration of the responsive vibration become virtually zero.

The residual vibration of the responsive vibration after time t2 in FIG. 28A presents the acceleration greater than or equal to about 0.02 G, which is the strength of the acceleration that can be perceived by a human being. Therefore, in FIG. 28A, the residual vibration is generated that can be perceived by a human being after time t2 at which the drive signal is turned off, and hence, it is difficult to present the sense of clicking. Also, this is the same in FIGS. 28B, 28C, and 28D.

Among FIGS. 28A-28D, FIG. 28B (the case of inputting the drive signal having the frequency of 210 Hz×(5/4) and the damping characteristic into the LRA 140 for five cycles) exhibits the least residual vibration. However, even in the case of FIG. 28B, the residual vibration is generated that can be perceived by a human being after time t2 at which the drive signal is turned off, and hence, it is difficult to present the sense of clicking.

In this way, if the resonance frequency of the LRA 140 has a characteristic that varies depending on the acceleration amplitude, the residual vibration may not be checked down to a level not perceived by a human being, even if it is adjusted as described above considering an error of the rated value of the resonance frequency in the third drive condition.

Also, this may be considered to be the same when using the first, second, and fourth drive conditions described above, and hence, the residual vibration may not be checked down to a level not perceived by a human being, even if the resonance frequency is adjusted by using the first, second, and fourth drive conditions.

Therefore, in the first embodiment, the residual vibration is checked down to a level not perceived by a human being, by varying the drive signal frequency with time, based on a characteristic of the resonance frequency of the LRA 140 that varies depending on the acceleration amplitude. In the following, a specific method will be described.

FIGS. 29A-29B are diagrams that illustrate waveforms of drive signals and displacement of responsive vibrations by a method of drive control of an LRA 140 according to the first embodiment. FIG. 29A illustrates the displacement of the responsive vibration when inputting the drive signal having the frequency of 210 Hz×(5/4) and the damping characteristic into the LRA 140 for five cycles starting at time t1 under the third drive condition. The displacement of the responsive vibration illustrated in FIG. 29A is the same as the displacement of the responsive vibration illustrated in FIG. 28B, of the resonance frequency of the LRA 140 that varies depending on the acceleration amplitude. The displacement of the responsive vibration illustrated in FIGS. 29A-29B9 is obtained in a state where the touch panel 120 has the LRA 140 attached as illustrated in FIG. 3.

In FIG. 29A, the frequency of the responsive vibration is about 205 Hz in regions where the amplitude of the responsive vibration is comparatively small, such as just after time t1 and just before time t2, and the frequency of the response signal is about 215 Hz before and after time t1A at which the amplitude of the responsive vibration becomes maximum.

This implies that the resonance frequency of the LRA 140 varies from 205 Hz to 215 Hz depending on the acceleration amplitude.

Therefore, the method of drive control of the LRA 140 in the first embodiment controls driving the LRA 140 by using a characteristic q(t) in which the drive signal frequency of the LRA 140 varies to 205 Hz, 215 Hz, and 205 Hz with time.

FIG. 29B illustrates a drive signal and the displacement of the responsive vibration in which the drive signal vibrates the LRA 140 five times. The drive signal is obtained from a drive signal having the frequency f1=(5/4)×q(t), multiplied by the damping characteristic, by using the characteristic q(t) in which the drive signal frequency of the LRA 140 varies to 205 Hz, 215 Hz, and 205 Hz with time. The characteristic q(t) has a temporal change characteristic in which the frequency of the displacement of the responsive vibration illustrated in FIG. 29A increases from 205 Hz at time t1 to 215 Hz at time t1A, and after that, decreases to 205 Hz at time t2. This characteristic q(t) will be described later.

As illustrated in FIG. 29B, by driving the LRA 140 by the drive signal that uses the characteristic q(t) of the frequency corresponding to the resonance frequency of the LRA 140 that varies depending on the acceleration amplitude, the displacement, speed, and acceleration of the responsive vibration become virtually zero just after time t2 at which the drive signal is turned off, and the acceleration after time t2 is about less than or equal to 0.02 G, which is the strength of acceleration that cannot be perceived by a human being.

As above, in the first embodiment, the drive signal frequency is varied with time depending on a characteristic of the resonance frequency of the LRA 140 that varies depending on the acceleration amplitude, to control driving the LRA 140.

By executing such drive control, the residual vibration is checked down to a level not perceived by a human being. In the following, a specific method of obtaining the characteristic q(t) will be described.

Figure 30A:
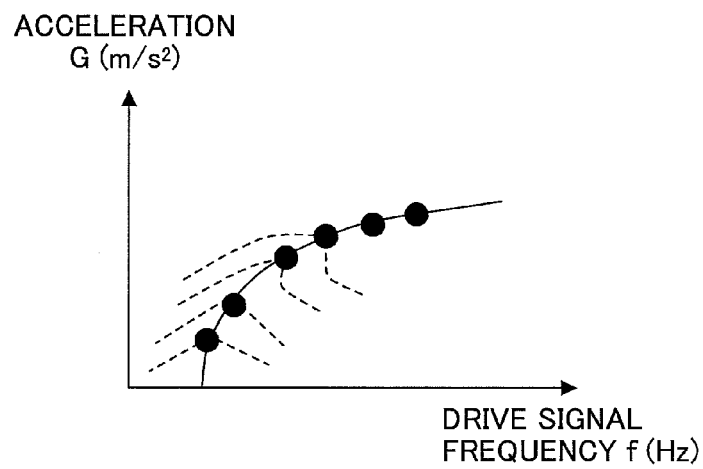
FIGS. 30A-30C are diagrams (part 1) that illustrate stepwise a method of generating a drive signal of an LRA 140 according to the first embodiment.
Figure 30B:
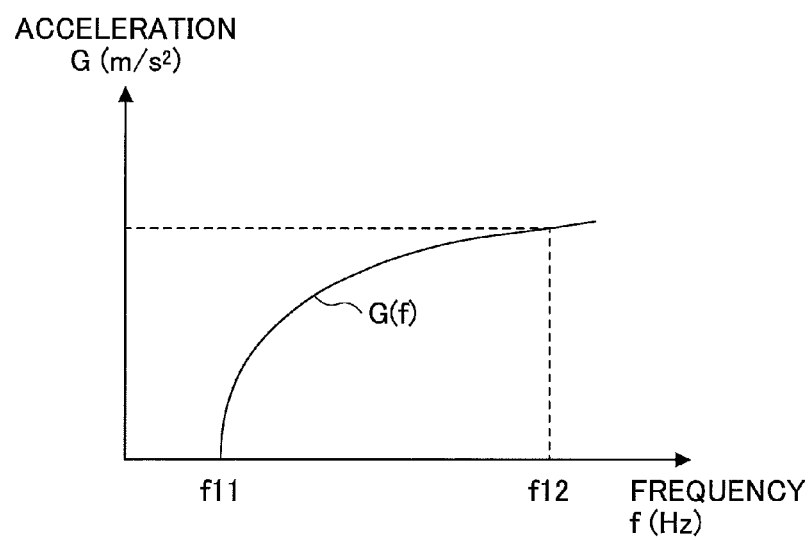
Figure 30C:
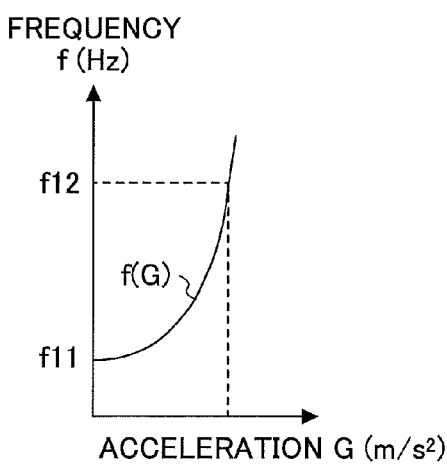

FIGS. 30A-30C are diagrams (part 1) that illustrate stepwise a method of generating the drive signal of the LRA 140 according to the first embodiment.

First, the method inputs a sinusoidal drive signal into the LRA 140 to drive it, and measures the steady amplitude of the acceleration of the responsive vibration of the LRA 140. The sinusoidal drive signal frequency f is set to multiple values including the rated value of the resonance frequency of the LRA 140, and values around the rated value, to measure the steady amplitude of the acceleration of the responsive vibration by driving the LRA 140 by the multiple frequencies. Note that the steady amplitude of the acceleration of the responsive vibration is measured in a state where the touch panel 120 has the LRA 140 attached as illustrated in FIG. 3.

In this way, by inputting multiple types of sinusoidal drive signals having different frequencies into the LRA 140 to measure the steady amplitude of the acceleration of the responsive vibration, the characteristic of the steady amplitude of the acceleration of the responsive vibration with respect to the frequency f is obtained as illustrated in FIG. 30A.

For example, if the rated value of the resonance frequency of the LRA 140 is 225 Hz, and an actual resonance frequency of the LRA 140 may fall in a range between 205 Hz and 235 Hz due to an error of the resonance frequency, a margin of, for example, 5 Hz may be assumed, and the steady amplitude of the acceleration of the responsive vibration is measured by inputting sinusoidal drive signals having multiple frequencies f into the LRA 140 in a range of 200 Hz to 240 Hz. Here, the range of resonance frequencies that takes the error into consideration is 205 Hz to 235 Hz, and the range further having the additional margin added is 200 Hz to 240 Hz.

For example, by measuring the steady amplitude of the acceleration of the responsive vibration by inputting sinusoidal drive signals having multiple frequencies f into the LRA 140 in the range of 200 Hz to 240 Hz, changed by 1 Hz by 1 Hz, the characteristic of the acceleration with respect to the drive signal frequency f is obtained as illustrated in FIG. 30A. Multiple points illustrated in FIG. 30A represent the steady amplitude of the acceleration of the responsive vibration obtained at the respective frequencies f.

Next, a curve is obtained by interpolating the steady amplitudes of the acceleration of the responsive vibration with respect to the frequencies by a high-degree formula or the like as illustrated in FIG. 30A. In other words, a formula that represents a curve fitting to the multiple points illustrated in FIG. 30A is obtained. The curve obtained in this way is illustrated in FIG. 30B, which is represented by G(f), a function of the frequency f. The function G(f) represents a characteristic of the steady amplitude of the acceleration of the responsive vibration with respect to the frequency f. Note that a frequency f11 is a frequency when the acceleration G is zero (G=0), and a frequency f12 is a frequency at which the steady amplitude of the acceleration is maximum when driving the LRA 140 by the maximum rated voltage.

Next, the inverse function of the function G(f) that represents the curve illustrated in FIG. 30B is obtained. As illustrated in FIG. 30C, the inverse function f(G) is obtained as a characteristic in which the frequency f on the vertical axis changes with respect to change of the acceleration G on the horizontal axis.

Next, by using the inverse function f(G) of G(f) obtained as described above, the resonance frequency f0 is changed from 200 Hz to 240 Hz, to obtain the characteristic q(t) and the best resonance frequency f0. In the description below, Step S1 to Step S7 are repeatedly executed while changing the resonance frequency f0 from 200 Hz to 240 Hz. The range of the resonance frequency f0 from 200 Hz to 240 Hz is a range that is obtained considering the error of the resonance frequency and the margin (5 Hz) as described above.

FIGS. 31A-31D are diagrams (part 2) that illustrate stepwise the method of generating the drive signal of the LRA 140 according to the first embodiment. Note that in the following, the LRA 140 is driven in a state where the touch panel 120 has the LRA 140 attached as illustrated in FIG. 3.

First, at Step S1, the LRA 140 is driven by using one of the first to fourth drive conditions described above. Here, for example, assume that the LRA 140 is driven by the third drive condition. Also, as the first execution of the repetition of Step S1 to Step S7, the LRA 140 is driven by the third drive condition with the resonance frequency f0 set to 200 Hz.

The third drive condition is to vibrate the LRA 140 m times by a drive signal that includes the frequency f1=(m/n)×f0, and is multiplied by the damping characteristic obtained by the damping rate of a vibration system having the LRA 140 mounted, where f0 is the resonance frequency of the LRA 140, if m and n are natural numbers other than zero, and m≠n.

The drive signal by the third drive condition is represented as $Z1=A(e^{-\sigma t})\sin 2\pi f1 t$ by using the frequency f1 and the damping rate σ. This drive signal Z1 has a waveform as illustrated in FIG. 31A.

Figure 31C:
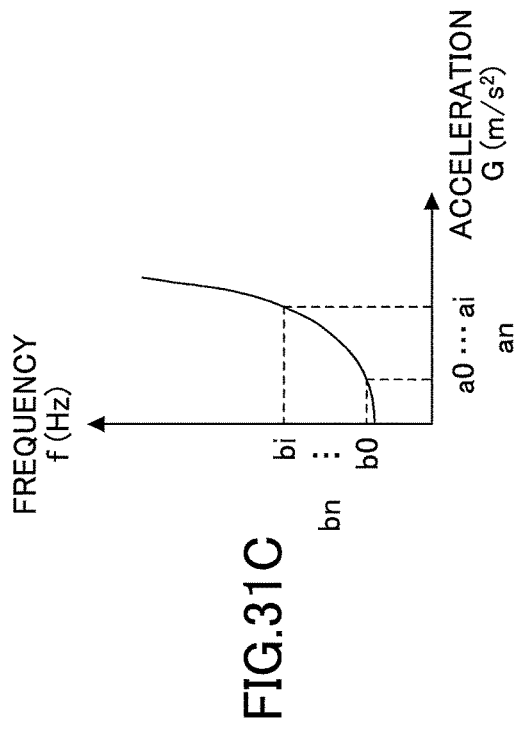
FIGS. 31A-31D are diagrams (part 2) that illustrate stepwise a method of generating a drive signal of an LRA 140 according to the first embodiment.
Figure 31D:
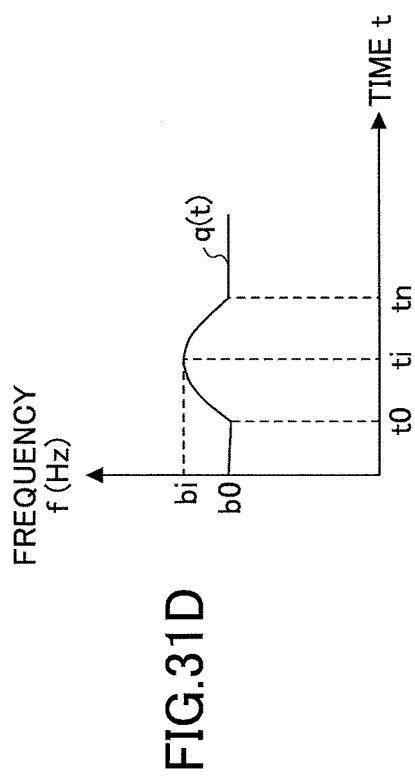
Figure 31A:
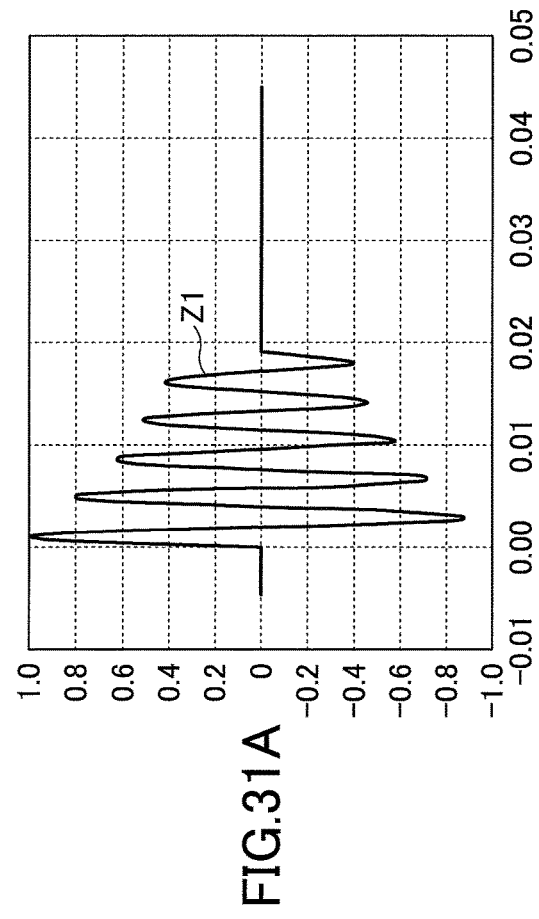
Figure 31B:
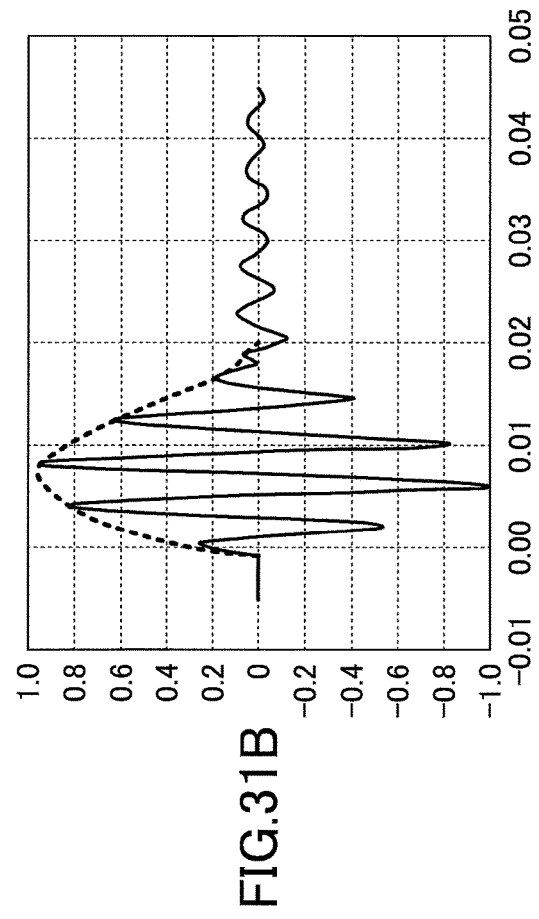

Next, at Step S2, the acceleration of the responsive vibration is measured that is obtained by driving the LRA 140 by the drive signal Z1 illustrated in FIG. 31A. The acceleration of the responsive vibration is represented by a waveform illustrated in FIG. 31B.

The acceleration of the responsive vibration may be measured, for example, by using an accelerometer at time t=[t0, . . . , ti, . . . , tn], and converting the measured values into digital values so as to be obtained as discrete digital-value acceleration a=[a0, . . . , ai, . . . , an]. This acceleration data includes time-series discrete values.

Next, at Step S3, by applying Hilbert transformation to the acceleration a=[a0, . . . , ai, . . . , an], data of the envelope of the acceleration w=[w0, . . . , wi, . . . , wn] is obtained. The data of the envelope of the acceleration w is time-series discrete values that represents an envelope designated by a dashed line in FIG. 31B, and represents the envelope that connects maximal values of the acceleration.

Next, at Step S4, the data of the envelope of the acceleration w=[w0, . . . , wi, . . . , wn] is substituted in the inverse function f(G) illustrated in FIG. 30C, and time series data of the frequency b=[b0, . . . , bi, . . . , bn] is obtained as illustrated in FIG. 31C. Since the data values of the envelope (w0 to wn) represent the acceleration, they can be substituted as the acceleration G in the inverse function f(G).

Next, at Step S5, a correspondence between the time t=[t0, . . . , ti, . . . , tn] and the time series data of the frequency b=[b0, . . . , bi, . . . , bn] is obtained, which is then interpolated by a high-degree formula or the like, to obtain a characteristic q(t) illustrated in FIG. 31D. The characteristic q(t) represents the characteristic illustrated in FIG. 31D. The characteristic q(t) represents a time characteristic of the resonance frequency of the LRA 140 that varies with time illustrated in FIG. 29A. When driving the LRA 140 whose resonance frequency varies depending on the acceleration amplitude, the acceleration varies with time, and hence, the resonance frequency varies with time. The characteristic q(t) represents such a time characteristic in which the resonance frequency varies with time.

Figure 32A:
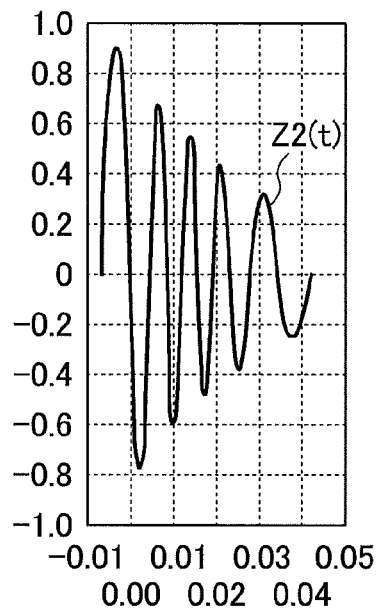
FIGS. 32A-32B are diagrams (part 3) that illustrate stepwise a method of generating a drive signal of an LRA 140 according to the first embodiment.
Figure 32B:
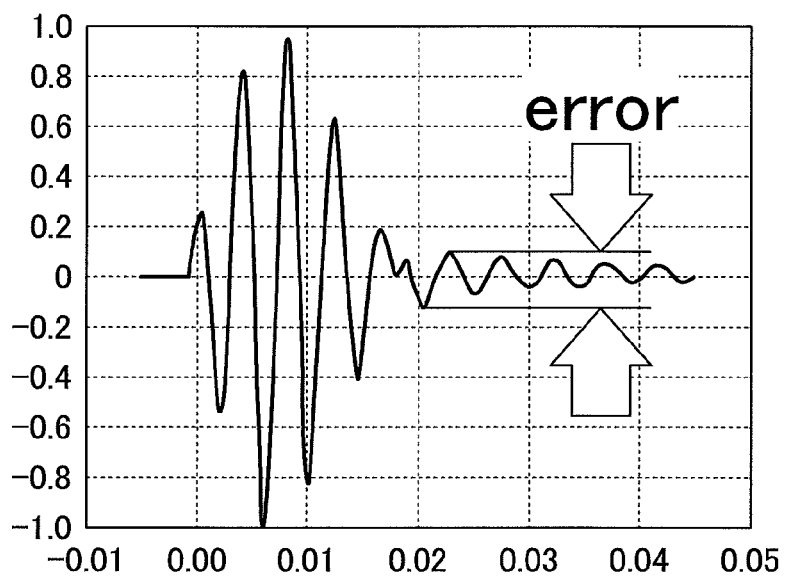

FIGS. 32A-32B are diagrams (part 3) that illustrate stepwise the method of generating the drive signal of the LRA 140 according to the first embodiment. In the following, the LRA 140 is driven in a state where the touch panel 120 has the LRA 140 attached as illustrated in FIG. 3.

Next, at Step S6, f0 included in f1 in the drive signal $Z1=A(e^{-\sigma t})\sin 2\pi f1 t$ is replaced with q(t), to obtain the drive signal Z2(t). The drive signal Z2(t) is as illustrated in FIG. 32A, and is represented by the following formula.

$$Z2(t)=A(e^{-\sigma t})\sin 2\pi(m/n)q(t)t$$

Next, at Step S7, the LRA 140 is driven by using the drive signal Z2(t), to measure the amplitude of the residual vibration illustrated in FIG. 32B as "error".

Then, Steps S1 to S7 are repeated while changing f0, to measure the amplitude of the residual vibration "error". By executing Steps S1 to S7 repeatedly, the amplitude of the residual vibration "error" is measured for multiple values of f0.

For example, assume that the amplitude of the residual vibration "error" is 0.05 G when driving the LRA 140 by the drive signal Z2(t) than includes the characteristic q(t) corresponding to f0=200 Hz. Also, assume that the amplitude of the residual vibration "error" is 0.04 G when driving the LRA 140 by the drive signal Z2(t) that includes the characteristic q(t) corresponding to f0=200 Hz.

The amplitude of the residual vibration "error" is further obtained in this way by changing f0 by 1 Hz by 1 Hz, and assume that the amplitude of the residual vibration "error" is 0.01 G when driving the LRA 140 by the drive signal Z2(t) that includes the characteristic q(t) corresponding to f0=210 Hz; and the amplitude of the residual vibration "error" is 0.05 G when driving the LRA 140 by the drive signal Z2(t) that includes the characteristic q(t) corresponding to f0=240 Hz.

In this case, the residual vibration "error" when driving the LRA 140 by the drive signal Z2(t) that includes the characteristic q(t) corresponding to f0=210 Hz, is 0.01 G, and it is the minimum. Therefore, the best resonance frequency f0 is obtained as 210 Hz. The best resonance frequency f0 is an example of a frequency f2. The frequency f2 is a frequency that is included in the range of the resonance frequency f0 that takes the error into consideration.

In this way, the reason why the amplitude of the residual vibration "error" becomes less than or equal to 0.02 G, which is the lower limit of the human perceptibility, is that all the displacement x, speed x', and acceleration x" of the responsive vibration become zero.

The drive control apparatus in the first embodiment obtains the resonance frequency f0 at which the amplitude of the residual vibration "error" takes the minimum as described above.

Then, by driving the LRA 140 by using the best resonance frequency f0 obtained as described above, a favorable sense of clicking can be presented, without making a human being perceive the amplitude of the residual vibration.

Therefore, according to the first embodiment, even if the resonance frequency of the LRA 140 has a characteristic that changes depending on the acceleration amplitude, by having time characteristic q(t) of the resonance frequency of the LRA 140 that varies with time substituted into the drive signal Z1, a timing can be securely obtained at which all the displacement x, speed x', and acceleration x" of the responsive vibration become zero.

Therefore, by using the time characteristic q(t) of the resonance frequency of the LRA 140 that varies with time, as the waveform data 240 that represents the drive signal driving the LRA 140, the sense of clicking can be presented by the vibration generated by the LRA 140.

Note that data that representing the time characteristic q(t) of the resonance frequency of the LRA 140 that varies with time is discrete numerical-value data, and may be stored in the memory 220 as the waveform data 240 (see FIG. 5).

Also, in the above description, as the driving method of the LRA 140 that can reduce the residual vibration, the method has been described in which the time characteristic q(t) of the resonance frequency of the LRA 140 that varies with time, is obtained under the first to fourth drive conditions. However, a drive signal under a drive condition other than the first to fourth drive conditions may be used to obtain a time characteristic q(t) of the resonance frequency of the LRA 140 that varies with time, to drive the LRA 140.

Also, in the above description, although the time characteristic q(t) is obtained from the data of the envelope of the acceleration of the responsive vibration (see FIG. 31B), the method for obtaining the time characteristic q(t) is not limited to that. The time characteristic q(t) may be obtained, for example, by approximating the displacement of the responsive vibration in FIG. 31B by a sine wave.

Second Embodiment

In the following, a second embodiment will be described with reference to the drawings. In the second embodiment, the resonance frequency f0 of the LRA 140 is set to a value that is measured in a state where the electronic device 100 has the LRA 140 installed. In the description of the second embodiment, only different points from the first embodiment will be described. Also, in the second embodiment, elements having substantially the same function as in the first embodiment are assigned the same codes that are used in the description of the first embodiment, and their description is omitted.

In the second embodiment, a resonance frequency f0' of the touch panel 120 is measured in a state where the electronic device 100 has the LRA 140 installed. Then, in the second embodiment, when calculating the frequency f1 of the drive signal Z, the resonance frequency f0' is used.

Figure 33:
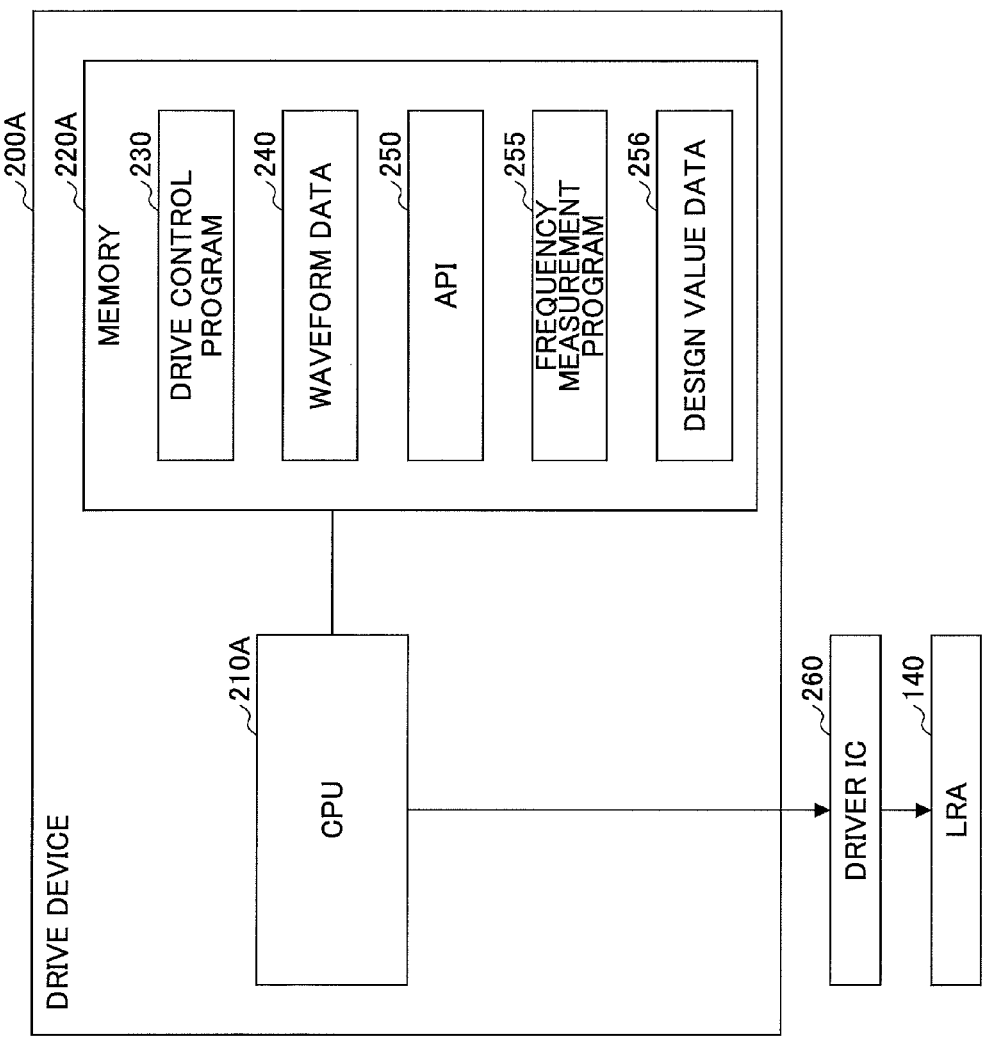
FIG. 33 is a diagram that illustrates a drive apparatus according to a second embodiment.

FIG. 33 is a diagram that illustrates a drive apparatus according to the second embodiment. The drive apparatus 200A in the second embodiment includes a CPU 210A and a memory 220A.

The CPU 210A reads and executes a frequency measurement program 255 that is stored in the memory 220A, to measure and reset the resonance frequency f0' as will be described later.

The memory 220A stores the frequency measurement program 255 and design value data 256 in addition to the drive control program 230, the waveform data 240, and the API 250.

The frequency measurement program 255 has the CPU 210A execute a measurement process of the resonance frequency of the LRA 140 f0', for example, in a state where the electronic device 100 has the LRA 140 installed. The design value data 256 includes values predetermined when the electronic device 100 has been designed. The design value data 256 in the second embodiment may include, for example, the natural resonance frequency f0 of the LRA 140.

In the following, measurement of the resonance frequency f0' will be described according to the second embodiment.

FIG. 34 is a flowchart that illustrates a measurement process of a resonance frequency according to the second embodiment.

In the second embodiment, when a measurement command of the resonance frequency f0' is issued to the electronic device 100 (Step S1701), the CPU 210A reads the frequency measurement program 255. In the second embodiment, a measurement command of the resonance frequency f0' is issued when, for example, a process to assemble the LRA 140 and the touch panel 120 into the housing 110 has been completed in a manufacturing process of the electronic device 100, or factory shipment.

The frequency measurement program 255 has the CPU 210A apply sine waves of multiple frequencies in a predetermined frequency band, as drive signals, to the LRA 140 (Step S1702). Specifically, the CPU 210A applies drive signals, for example, between 100 Hz and 300 HZ, including a sine wave having the frequency 100 Hz, a sine wave having the frequency 110 Hz, . . . , a sine wave having the frequency 290 Hz, and a sine wave having the frequency 300 Hz, to the LRA 140.

The frequency measurement program 255 has the CPU 210A store maximum values of the acceleration of the vibration of the touch panel 120 for the respective drive signals having different frequencies, in the memory 220A (Step S1703). Specifically, the electronic device 100 has an acceleration sensor installed (not illustrated), to detect a maximum value of the acceleration of the vibration of the touch panel 120 every time a drive signal having one of the different frequencies is applied to the LRA 140. The memory 220 has an area to store calculation results by the frequency measurement program 255, in which the maximum values of the acceleration for the drive signals are temporarily stored.

Next, the frequency measurement program 255 has the CPU 210A select a drive signal frequency with which the acceleration is maximum among the acceleration values that have been stored in the memory 220A (Step S1704). Next, the frequency measurement program 255 sets the select drive signal frequency as the resonance frequency f0', and has the CPU 210A overwrite the design value data 256 in the memory 220A by the resonance frequency f0' (Step S1705).

In the second embodiment, this step changes the resonance frequency from f0 to f0'. Therefore, in the second embodiment, the frequency f1 of the drive signal to check the residual vibration is f1=(m/n)×f0'.

Therefore, in the second embodiment, the drive signal f1 can be calculated based on the resonance frequency f0' of the touch panel 120 which a user's finger directly contacts, for example, in a case where vibrations of the touch panel 120, the housing 110 and the like are superposed on the LRA 140. Thus, in the second embodiment, the sense of touch generated by a short time waveform that damps steeply in one to several cycles, can be directly presented for the user, and the sense of clicking can be presented.

Note that in the second embodiment, although the resonance frequency f0' is assumed to be measured by the frequency measurement program 255, the resonance frequency f0' may be measured externally out of the electronic device 100, by which the design value data 256 in the memory 220A is overwritten.

Also, the second embodiment can be applied to the electronic device 100A.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A drive apparatus, comprising:
   a memory configured to store waveform data that represents
   a first drive signal configured to vibrate a vibration-generating device m times, the first drive signal being a sine wave satisfying a frequency $f1=(m/n)\times q(t)$ (where m and n are natural numbers other than zero, different from each other), q(t) being a time characteristic of a resonance frequency of the vibration-generating device, or
   a second drive signal configured to vibrate the vibration-generating device $((m/2)\times r)$ times (where r is a natural number other than zero), the second drive signal being a sine wave satisfying the frequency $f1=(m/n)\times q(t)$ (where m and n are positive odd numbers different from each other),
   wherein the vibration-generating device having a rated value f0 of the resonance frequency, and having a frequency characteristic such that the resonance frequency varies depending on an acceleration amplitude in a first range from a first resonance frequency to a second resonance frequency including the rated value f0; and
   a drive-processor configured to read the waveform data stored in the memory, and to output the first drive signal or the second drive signal corresponding to the waveform data to the vibration-generating device,
   wherein the time characteristic q(t) is a time characteristic such that the resonance frequency of the vibration-generating device varies with time, the time characteristic q(t) being obtained when driving the vibration-generating device by
   a third drive signal configured to vibrate the vibration-generating device m times, the third drive signal being a sine wave satisfying the frequency $f1=(m/n)\times f2$ (where m and n are natural numbers other than zero, different from each other), f2 being a frequency included in a second range of the resonance frequency, the second range taking an error into consideration, or
   a fourth drive signal configured to vibrate the vibration-generating device $((m/2)\times r)$ times (where r is a natural number other than zero), the fourth drive signal being a sine wave satisfying the frequency $f1=(m/n)\times f2$ (where m and n are positive odd numbers different from each other),
   wherein the time characteristic q(t) is a time characteristic such that the resonance frequency of the vibration-generating device varies with time, the time characteristic q(t) being obtained by substituting acceleration representing an envelope of acceleration of displacement of responsive vibration into a frequency characteristic of the acceleration amplitude of the resonance frequency of the vibration-generating device, the responsive vibration being obtained by driving the vibration-generating device in response to the third drive signal or the fourth drive signal.

2. The drive apparatus as claimed in claim 1, wherein the waveform data stored in the memory is waveform data that represents a drive signal obtained by multiplying the first drive signal or the second drive signal by a damping characteristic of a damping rate of a vibration system having the vibration-generating device mounted.

3. The drive apparatus as claimed in claim 1, wherein the frequency f1 satisfies $f1=(m/n)\times f0$ (where m and n are natural numbers other than zero and m>n).

4. An electronic device, comprising:
   a touch panel;
   a vibration-generating device configured to have a rated value f0 of a resonance frequency, and having a frequency characteristic such that the resonance frequency varies depending on an acceleration amplitude in a first range from a first resonance frequency to a second resonance frequency including the rated value f0, and to vibrate the touch panel;
   a drive apparatus that includes a memory configured to store waveform data that represents
   a first drive signal configured to vibrate the vibration-generating device m times, the first drive signal being a sine wave satisfying a frequency $f1=(m/n)\times q(t)$ (where m and n are natural numbers other than zero, different from each other), q(t) being a time characteristic of the resonance frequency of the vibration-generating device, or
   a second drive signal configured to vibrate the vibration-generating device $((m/2)\times r)$ times (where r is a natural number other than zero), the second drive signal being a sine wave satisfying the frequency $f1=(m/n)\times q(t)$ (where m and n are positive odd numbers different from each other), and
   a drive-processor configured to read the waveform data stored in the memory, and to output the first drive signal or the second drive signal corresponding to the waveform data to the vibration-generating device,
   wherein the time characteristic q(t) is a time characteristic such that the resonance frequency of the vibration-generating device varies with time, the time characteristic q(t) being obtained when driving the vibration-generating device by
   a third drive signal configured to vibrate the vibration-generating device m times, the third drive signal being a sine wave satisfying the frequency $f1=(m/n)\times f2$ (where m and n are positive odd numbers different from each other), f2 being a frequency included in a second range of the resonance frequency, the second range taking an error into consideration, or
   a fourth drive signal configured to vibrate the vibration-generating device $((m/2)\times r)$ times (where r is a natural number other than zero), the fourth drive signal being a sine wave satisfying the frequency $f1=(m/n)\times f2$ (where m and n are positive odd numbers different from each other),
   wherein the time characteristic q(t) is a time characteristic such that the resonance frequency of the vibration-generating device varies with time, the time characteristic q(t) being obtained by substituting acceleration representing an envelope of acceleration of displacement of responsive vibration into a frequency characteristic of the acceleration amplitude of the resonance frequency of the vibration-generating device, the responsive vibration being obtained by driving the vibration-generating device in response to the third drive signal or the fourth drive signal.

5. A non-transitory computer-readable recording medium having a program stored therein for causing a computer to execute a process, the process comprising:

reading waveform data that represents
- a first drive signal configured to vibrate a vibration-generating device m times, the first drive signal being a sine wave satisfying a frequency f1=(m/n)×q(t) (where m and n are natural numbers other than zero, different from each other), q(t) being a time characteristic of a resonance frequency of the vibration-generating device, or
- a second drive signal configured to vibrate the vibration-generating device ((m/2)×r) times (where r is a natural number other than zero), the second drive signal being a sine wave satisfying the frequency f1=(m/n)×q(t) (where m and n are positive odd numbers different from each other), wherein the vibration-generating device has a rated value f0 of the resonance frequency, and has a frequency characteristic such that the resonance frequency varies depending on an acceleration amplitude in a first range from a first resonance frequency to a second resonance frequency including the rated value f0; and outputting the first drive signal or the second drive signal corresponding to the waveform data to the vibration-generating device, wherein the time characteristic q(t) is a time characteristic such that the resonance frequency of the vibration-generating device varies with time, the time characteristic q(t) being obtained when driving the vibration-generating device by
- a third drive signal configured to vibrate the vibration-generating device m times, the third drive signal being a sine wave satisfying the frequency f1=(m/n)×f2 (where m and n are natural numbers other than zero, different from each other), f2 being a frequency included in a second range of the resonance frequency, the second range taking an error into consideration, or
- a fourth drive signal configured to vibrate the vibration-generating device ((m/2)×r) times (where r is a natural number other than zero), the fourth drive signal being a sine wave satisfying the frequency f1=(m/n)×f2 (where m and n are positive odd numbers different from each other), wherein the time characteristic q(t) is a time characteristic such that the resonance frequency of the vibration-generating device varies with time, the time characteristic q(t) being obtained by substituting acceleration representing an envelope of acceleration of displacement of responsive vibration into a frequency characteristic of the acceleration amplitude of the resonance frequency of the vibration-generating device, the responsive vibration being obtained by driving the vibration-generating device in response to the third drive signal or the fourth drive signal.

6. A method of generating a drive signal, the method comprising:

obtaining a time characteristic q(t) such that a resonance frequency of a vibration-generating device varies with time, the time characteristic q(t) being obtained when driving the vibration-generating device by
- a first drive signal configured to vibrate the vibration-generating device m times, the first drive signal being a sine wave satisfying a frequency f1=(m/n)×f2 (where m and n are natural numbers other than zero, different from each other), f2 being a frequency included in a first range of the resonance frequency, the first range taking an error into consideration, or
- a second drive signal configured to vibrate the vibration-generating device ((m/2)×r) times (where r is a natural number other than zero), the second drive signal being a sine wave satisfying the frequency f1=(m/n)×f2 (where m and n are positive odd numbers different from each other), wherein the vibration-generating device has a rated value f0 of the resonance frequency, and has a frequency characteristic such that the resonance frequency varies depending on an acceleration amplitude in a second range from a first resonance frequency to a second resonance frequency including the rated value f0; and generating waveform data that represents
- a third drive signal configured to vibrate the vibration-generating device m times, the third drive signal being a sine wave satisfying the frequency f1=(m/n)×q(t) (where m and n are natural numbers other than zero, different from each other), q(t) being the time characteristic of the resonance frequency, or
- a fourth drive signal configured to vibrate the vibration-generating device ((m/2)×r) times (where r is a natural number other than zero), the fourth drive signal being a sine wave satisfying the frequency f1=(m/n)×q(t) (where m and n are positive odd numbers different from each other), wherein the time characteristic q(t) is a time characteristic such that the resonance frequency of the vibration-generating device varies with time, the time characteristic q(t) being obtained by substituting acceleration representing an envelope of acceleration of displacement of responsive vibration into a frequency characteristic of the acceleration amplitude of the resonance frequency of the vibration-generating device, the responsive vibration being obtained by driving the vibration-generating device in response to the third drive signal or the fourth drive signal.

* * * * *